(12) United States Patent
Rappaport et al.

(10) Patent No.: US 7,542,969 B1
(45) Date of Patent: Jun. 2, 2009

(54) DOMAIN KNOWLEDGE-ASSISTED INFORMATION PROCESSING

(75) Inventors: Alain T. Rappaport, Woodside, CA (US); Dan Adamson, Dallas, TX (US); Leo Shih, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 11/265,994

(22) Filed: Nov. 3, 2005

Related U.S. Application Data

(60) Provisional application No. 60/624,558, filed on Nov. 3, 2004, provisional application No. 60/677,620, filed on May 4, 2005, provisional application No. 60/723,642, filed on Oct. 4, 2005.

(51) Int. Cl.
 *G06F 7/00* (2006.01)
 *G06F 17/30* (2006.01)
(52) U.S. Cl. .............................. 707/4; 707/6
(58) Field of Classification Search ............. 707/4, 707/6
 See application file for complete search history.

(56) References Cited

U.S. PATENT DOCUMENTS

| | | | |
|---|---|---|---|
| 6,789,076 B1 | 9/2004 | Dutta | |
| 6,944,611 B2 * | 9/2005 | Flank et al. | 707/3 |
| 7,065,500 B2 | 6/2006 | Singh et al. | |
| 7,299,222 B1 | 11/2007 | Hogan et al. | |
| 2002/0129015 A1 * | 9/2002 | Caudill et al. | 707/6 |
| 2005/0222901 A1 | 10/2005 | Agarwal et al. | |
| 2006/0004732 A1 | 1/2006 | Odom | |
| 2006/0047649 A1 * | 3/2006 | Liang et al. | 707/4 |
| 2006/0106793 A1 | 5/2006 | Liang | |

FOREIGN PATENT DOCUMENTS

KR   20020092843 A   12/2002

OTHER PUBLICATIONS

Protege' 2000 product User Guide A4, selected pages taken from Oct. 8, 2003 version of http://protege.stanford.edu accessed via www.archive.org. User Guide can be downloaded from http://protege.standford.edu/useit.html.*

Notess. "Review of Hotbot (Inktomil)" Feb. 21, 2008, Internet Wayback Machine Oct. 28, 2004 http://web:archive.org/web/2004/028102910/www.searchengineshowdown.com/features/hotbot> 5 pages.

OA Dated Jul. 31, 2008 for U.S. Appl. No. 11/543,017, 25 pages.

* cited by examiner

*Primary Examiner*—James Trujillo
*Assistant Examiner*—Bruce M Moser
(74) *Attorney, Agent, or Firm*—Amin, Turocy & Calvin, LLP

(57) ABSTRACT

A method of searching for information includes receiving a query, providing the query to a first search engine that searches a set of data sources, the data sources having relationships to an ontology, receiving search results from the search engine, analyzing the search results to determine at least one statistic corresponding to the search results and the query, wherein the statistic is based upon a relevance score that is calculated based upon a first weighting function related to a concept, a second weighting function related to a data source item, a set of items related to the concept, and a set of items related to the search results, and providing at least one concept to a user, wherein said at least one concept correspond to said at least one statistic.

30 Claims, 17 Drawing Sheets

```
CompoundTemplate
        genericName = IncludeInDomainFocus
        projectName = includeInDomainFocus
        commercialName =includeInDomainFocus
                        801
```

```
CompoundTemplate
        genericName = includeAllAsSynonyms
        projectName = includeAllAsSynonyms
        commercialName = includeAllAsSynonyms
                        802
```

```
CompoundTemplate
        genericName = includeInConceptExpansion
        projectName = includeInConceptExpansion
        commercialName = includeInConceptExpansion mechanismOfAction = expandConcept
                        803
```

| 1600 | | Baseball 1506 | Basketball 1508 |
|---|---|---|---|
| | Babe Ruth 1502 | 2 | 0 |
| | Michael Jordan 1504 | 1 | 2 |

DOMAIN KNOWLEDGE-ASSISTED INFORMATION PROCESSING

CROSS-REFERENCE TO RELATED APPLICATIONS

This application claims the benefit of U.S. Provisional Application No. 60/624,558, filed Nov. 3, 2004, U.S. Provisional Application No. 60/677,620, filed May 4, 2005, and U.S. Provisional Application No. 60/723,642, filed Oct. 4, 2005, all of which are incorporated by reference herein.

BACKGROUND

1. Field of the Invention

This invention relates generally to the field of information processing and to information modeling systems. More particularly, this invention relates to a method, process, apparatus, and system for establishing a search platform for finding, discovering, identifying, connecting, publishing, describing, filtering, processing, storing, defining workflow and/or notifying based on underlying ontology-based domain knowledge and statistical and numerical models.

2. Description of the Related Art

When applied to specific domains and industries (for example healthcare, finance, law, science) traditional search systems are handicapped by approaches to storing, searching, transmitting, and publishing data and/or services that lack domain or industry specificity. Users (e.g., the people or computer system executing a search or publishing information) are frequently unable to obtain satisfying results using traditional search systems. For example, a search engine ranking documents based on a popularity measure but without domain knowledge may not be able to rank documents at the top of the list when they are relevant rather than popular. To be successful, such engines increasingly require that the user have knowledge about the domain in question to an extent that is both prohibitive and unreasonable.

Platforms for publishing (e.g., websites, etc.) have used techniques such as indexing and meta-tagging with meta-data to increase the descriptive power and indexation of documents to increase the likelihood that they are retrieved easily. However, these and other techniques have issues such as naming inconsistencies, inadequate or arguable choices of descriptive fields and difficulty in the maintenance of large vocabularies. Issues such as these have plagued the field of information extraction, search and distribution.

Using an ontology system is one approach to help manage these challenges. However, one limitation of a traditional ontology is that the concepts and relationships in many domains is dynamic and evolving so that the creation and ongoing maintenance of an ontology is time-consuming and labor-intensive. As a result, the practical application of a traditional ontology is limited.

As an example, to create a traditional ontology to a search system in the sports domain, one might model basic concepts and relationships such as 1) the type of sport, 2) the teams within each sport, and 3) the players and coaches for each team. Even in this example, the creation and maintenance of this ontology across a small number of sports may require the modeling of hundreds of teams and thousands of players and coaches. A complete and up-to-date ontology may require historical information and the models would need to be updated whenever the teams within a sport expanded or contracted or whenever a player or coach was drafted or hired, changed teams, or retired.

In order to increase the efficiency of search and publishing, new approaches and techniques are needed to enhance domain knowledge.

SUMMARY

According to one aspect of the present invention, a modeling system enriched with information from a single or multiple sources is provided that allows for the intelligent extension, formulation or reformulation of a request into various processes including but not limited to transmission, discovery, notification, searching, filtering and storing processes. Embodiments of the invention build a network of connected information in a specific domain. In one embodiment, a system is provided that enhances the quality and specificity of the results for queries made in various systems including, but not limited to, search engines. Furthermore, the invention allows for definitions of workflow, searches and/or event subscription based on queries defined by or provided to the system.

To accomplish this increase in power of systems, the present invention, in one embodiment, includes the following: at least one tool capable of representing the domain; at least one tool capable of storing, processing, searching, publishing and/or transmitting information and/or data from multiple sources on components of the domain (including but not limited to objects, classes, database tables); and at least one service to generate statistical and/or numerical information on the components of the domain.

In one embodiment, a human modeler assisted by at least one tool or a electronic system assisted by at least one tool, creates a database of domain-specific components, or ontology, by interacting with a computer using input and output devices. At least one tool acquires information pertinent to each component from one or more sources. The system utilizes this information for use with one or more search, publication, discovery, and/or notification services.

For example, a user can provide a query intended to be executed in a search service to a software interface. The results can be the number of search results per component of the ontology, or the number of relations per component found pertinent to the query. These numbers, and their associated components, represent the statistics associated with the query. The system can then rank the components of the domain relevant to the query by using the statistics relevant to the domain. The system can then construct a new query that includes the original search service query and additional terms based on components selected from the system query, which can be arranged and formulated in user-defined or automated ways. The new query can then be transmitted to the search service, which may return a more focused set of results. Alternatively, the ontological system provides the components, which may be ranked and/or presented to the user as guides, which the user can then optionally use to refine the query in the existing search service.

The query-specific statistics can be used to design different strategies to enhance any of a multitude of information processes, for example, searching.

BRIEF DESCRIPTION OF THE DRAWINGS

The features of the present invention will be more fully understood by reference to the accompanying drawings, in which:

FIG. 5 is a user-interface showing the results of a search that has been enriched with data extracted from an ontology;

FIG. 8 are templates of certain domain specific rules;

DETAILED DESCRIPTION

Figure 1:
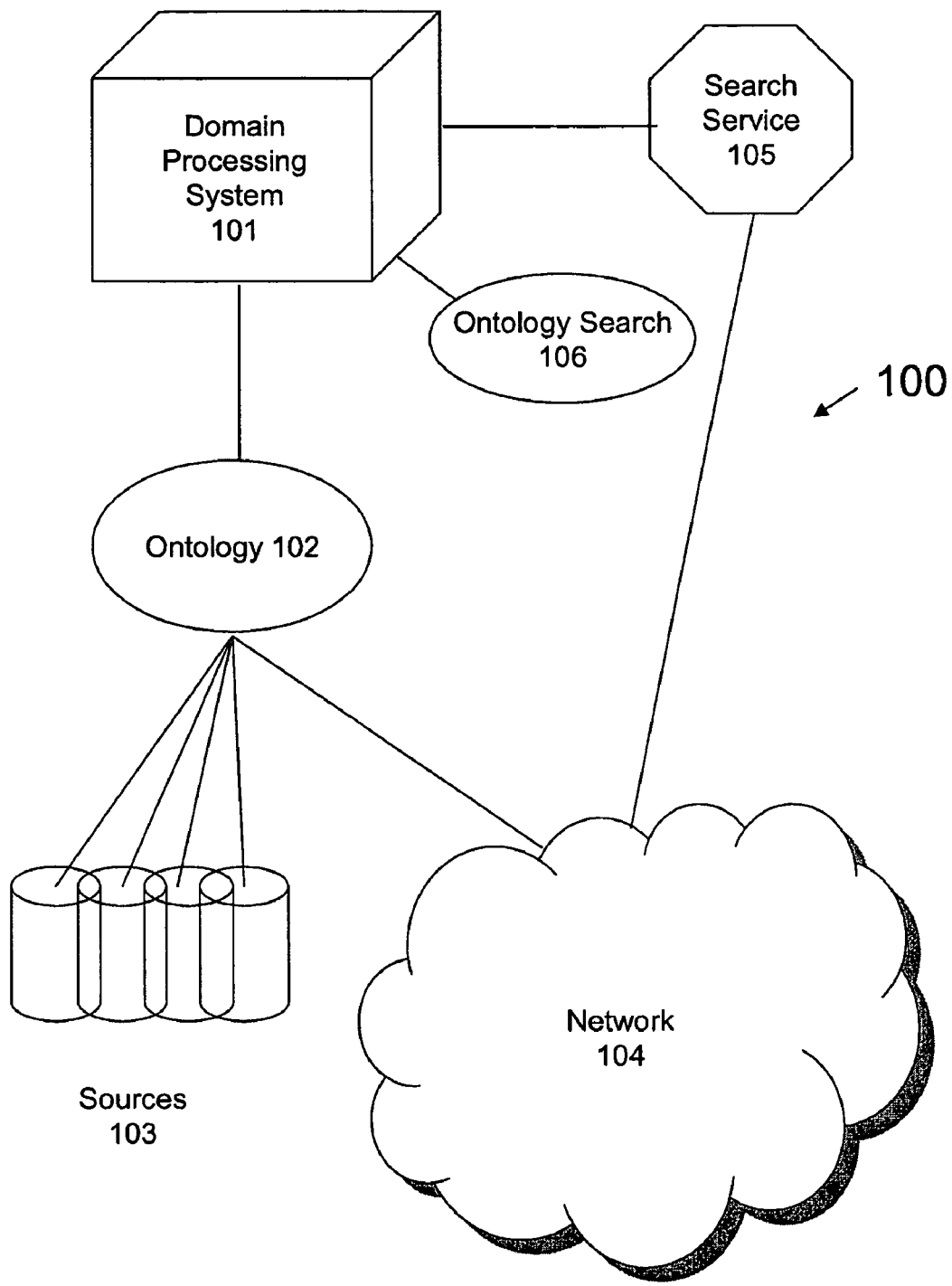
FIG. 1 is a simplified block diagram of a distributed computer network incorporating one embodiment of the present invention.

An ontological system 100 in accordance with one embodiment of the present invention is illustrated in FIG. 1. The ontological system 100 includes a domain processing system 101, an ontology 102, sources 103, a network 104 and a search service 105. The term "ontology" is a broad term intended to have its ordinary meaning. In one embodiment, an ontology is a data structure that contains models and associations and/or relationships between the models. In other embodiments, the models include concepts and relationships between the concepts. The ontological system 100 can be used, controlled, programmed, and/or interfaced with by one or more users. The term "user" is a broad term intended to have its ordinary meaning. In addition, the term "user" can mean a human operator or another system, which may in turn be operated by other systems or human users.

The domain processing system 101 works in conjunction with an ontology 102 which can optionally operate as described in WO 03/077142, which is incorporated by reference. The domain processing system can access, in addition to the ontology, information from various data sources 103 including data sources accessed through a network 104, such as the Internet, and/or from a plurality of networks. In one embodiment, the ontology supports a search service internal to or associated with the ontology (e.g., an ontology search service 106), and therefore specialized to the domain of the ontology.

The term "domain" is a broad term intended to have its ordinary meaning. In addition, the term "domain" can include an area of expertise for the system or a collection of material, information, content and/or other resources related to a particular subject or subjects. For example, a domain can refer to financial, healthcare, advertising, commerce, medical and/or biomedical-specific information. A domain can refer to information related to any particular subject matter or a combination of selected subjects.

For example, in some embodiments, the ontology models information or content relevant to a domain of interest or content of a particular class. Content can be any searchable information, for example, information distributed over a computer-accessible network, such as the Internet. Content can generally be classified into any of a number of content classes. Examples of content classes include, but are not limited to, travel destination information, financial information, healthcare information, advertising information, commerce information, pricing information, medical information, biomedical information, information about individual people, cultures, groups, sociological groups, market interest groups, institutions, universities, governments, teams, or any other information group.

When the content is text-based, such as a document, an article, a scientific paper, a patent, a book, a magazine, a transcript, or any other text-based content, the content can generally be directly modeled by the ontology, as described in greater detail below. When the content is not primarily text-based, such as multimedia, music, songs, video, audio, PODCAST®or any other media, the content can be indirectly modeled by the ontology by modeling text-based information relevant to the content. For example, in some embodiments, media content such as audio and video can be modeled by modeling a transcript, closed-caption transcript, lyrics, summary, or any other text-based information related to the audio and/or video content.

The ontology can be continuously updated by software agents that keep the information synchronized with the sources, adding information from the sources to the ontology as models, attributes of models, or associations between models within the ontology. For example, in the biomedical domain, a new clinical trial for a specific therapy can be detected and the drugs identified in the clinical trial can be added as instances of models to the ontology. In the financial domain, for example, when a news release is issued on a company, the news release and company can be automatically detected and added to the ontology. The content of the data sources can be carefully selected to limit noise and ensure focus on a particular domain. A high quality of content in the data sources 103 allows for highly accurate subsequent analyses of external materials in reference to the ontology's content.

In one embodiment, an ontological system 100 includes an ontology 102 that models the concepts of a domain, the data sources and data source content that contain information or discourse specific to those concepts, and the relationships between the concepts and data sources and data source content. The term "concept" is a broad term intended to have its ordinary meaning. In addition, the term concept can mean an idea of or subject matter related to the ontology, such as, for example, a "drug" can be a concept within a healthcare ontology. The relationships between the models and the data source content are created in addition to, or independent of, the traditional ontological relationships to other concepts of the domain.

The term "model" is a broad term intended to have its ordinary meaning. In addition, the term model can mean the machine-readable representation of a concept that is modeled in the ontology, such as, for example, a drug model that exists in a healthcare ontology. A model can also include a data structure that has fields associated with the concept. For example, a model of a drug can include a data structure that includes fields associated with a drug trade name, a drug generic name, a list of diseases known to have been studied by using the drug, a list of publications that discuss the drug or include the drug name, patents related to the drug, etc. and any other data structure field.

In one embodiment, when an ontology is related to a particular concept, the ontology also includes a corresponding model for that concept. In such cases, the model is used by the system.

The identification of relevant information to a model can be accomplished by any of a variety of methods, such as but not limited to, assignment by human editors, mapping of metatagging data, data-mining, or a broad or selective text search of the data source content using keywords based on the model. A system modeled in this manner can dynamically discover the relative strength of relationships between two concepts by determining the intersection of related data source content to the two concepts. This removes the task of defining relationships, a costly part of building a traditional ontology, as the number of potential relationships between concepts is exponentially larger than the number of concepts.

Data sources are sometimes part of the ontology, but in other embodiments, the data sources are not part of the ontology. For example, in some embodiments, the ontology communicates with the data sources over a network, such as the Internet. When the data sources are modeled as part of the ontology, the data source content can be model instances.

For example, in one embodiment, an ontology in a sports domain can be created to include models that represent various concepts, such as types of sports, teams, players, and coaches. In addition, the sports domain ontology can include explicit relationships between any of these concepts. In addition to ontological relationships that have been defined between models, relationships can exist between the concepts and articles of one or more sports columnists. For example, a model of the sport "Baseball" could be linked to articles written about baseball. Similarly, a model of the sport "Basketball" could be linked to one or more articles written about basketball. In addition, a model of the player "Babe Ruth" could be linked to one or more articles written about Babe Ruth and the model of the player "Michael Jordan" could be linked to one or more articles written about Michael Jordan.

A system utilizing these models could then use statistical inferencing techniques to determine that the model of "Babe Ruth" has a correlation to the model of "Baseball" and no correlation to the model of "Basketball" in the linked articles and therefore this system could determine that Babe Ruth was a baseball player. Similarly, such a system could compute that the model of "Michael Jordan" has a correlation to the model of "Basketball" and also a correlation to the model of "Baseball"; therefore, the system could determine that "Michael Jordan" was a basketball player and that he was also a baseball player. Techniques to determine the correlation between data sets are well known to those of skill in the art.

Figure 18:
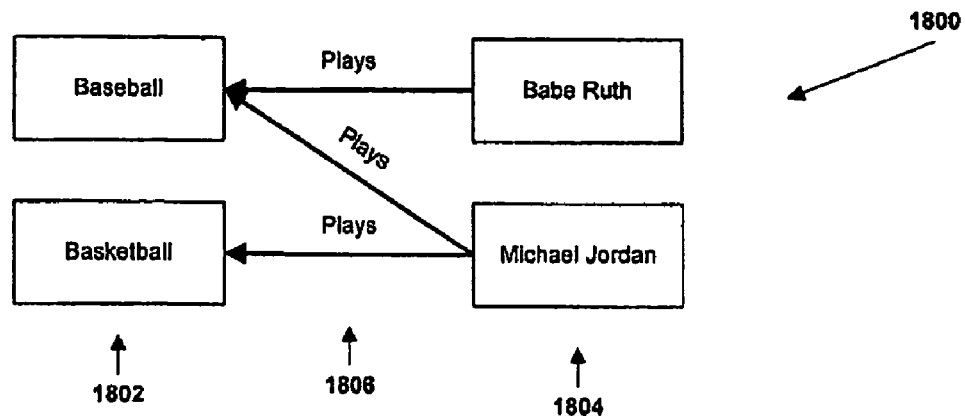
FIG. 18 illustrates one embodiment of an ontological model.

FIG. 18 illustrates one embodiment of an ontology model 1800 in the sports domain. The ontology model 1800 explicitly models two concepts, sports 1802 and athletes 1804, and shows the relationships 1806 between the sports 1802 and athletes 1804.

Figure 12:
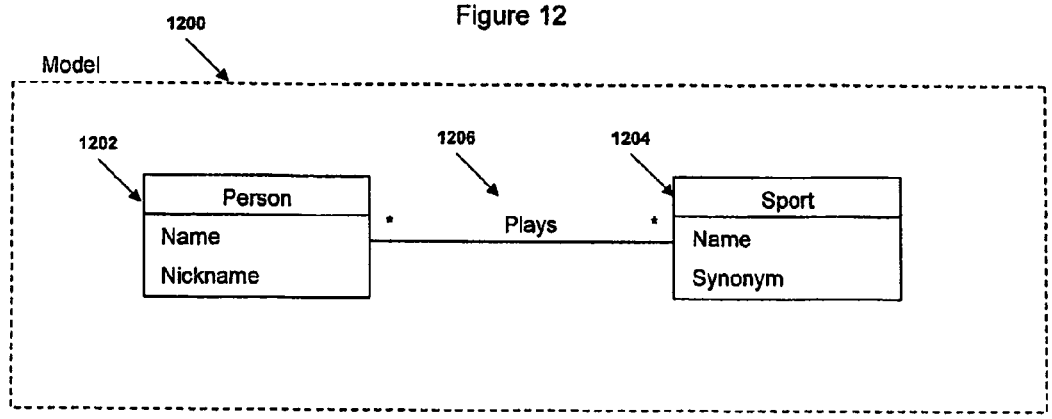
FIG. 12 is one embodiment of a model of an ontology that including two concepts and a relationship that links the two model concepts.

Another embodiment of a traditional ontology model is illustrated in FIG. 12. The model 1200 of FIG. 12 includes two concepts 1202, 1204 and a relationship 1206 that describes how the two concepts 1202, 1204 are related or linked to one another. In the example provided, the first concept 1202 is a data structure used to describe a person. The data structure includes fields for the person's name and nickname. Similarly, the second concept 1204 is a data structure used to describe a sport. The data structure includes fields for the sport's name and synonym. The relationship 1206 includes a "plays" relationship, which identifies which person plays which sport.

Figure 13:
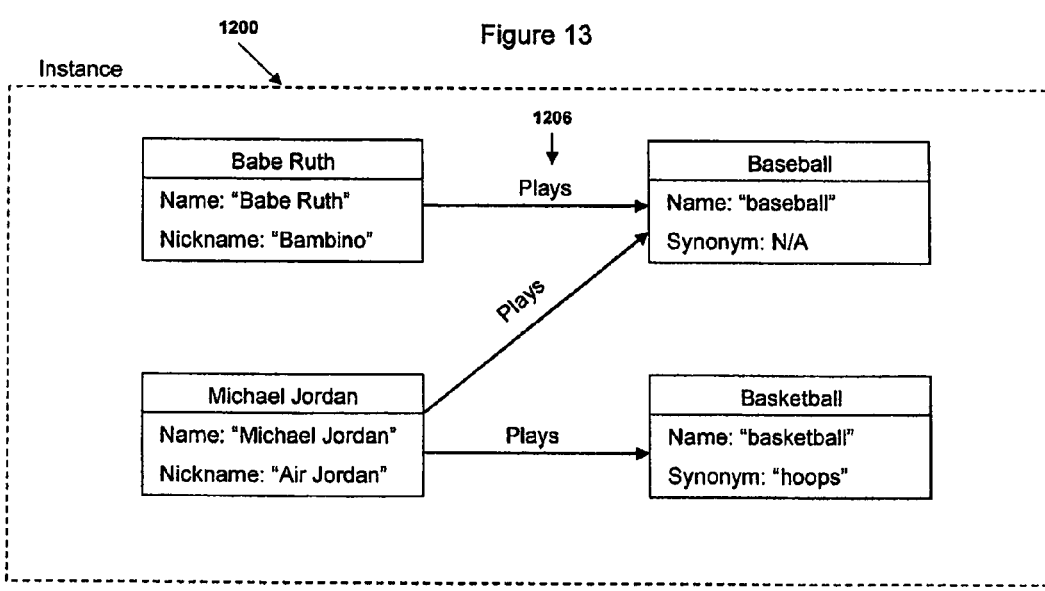
FIG. 13 illustrates one instance of the model of FIG. 12.

FIG. 13 illustrates one instance of the model of FIG. 12. In the model 1200 of FIG. 13, the relationships 1206 between various concept 1202, 1204 instances have been assigned. For example, the model 1200 has been configured to indicate that the Babe Ruth person concept plays the baseball sport concept. Similarly, the model 1200 has been configured to indicate that the Michael Jordan person concept plays both the baseball and basketball sport concepts. In the foregoing example, Babe Ruth and Michael Jordan are particular instances of the person concept 1202, and baseball and basketball are particular instances of the sport concept 1204.

In addition, the data structures associated with each concept instance have been populated with known information. For example, the ontological model includes nicknames for the Babe Ruth, Michael Jordan and Basketball concept instances, as shown.

Figures 16, 17:
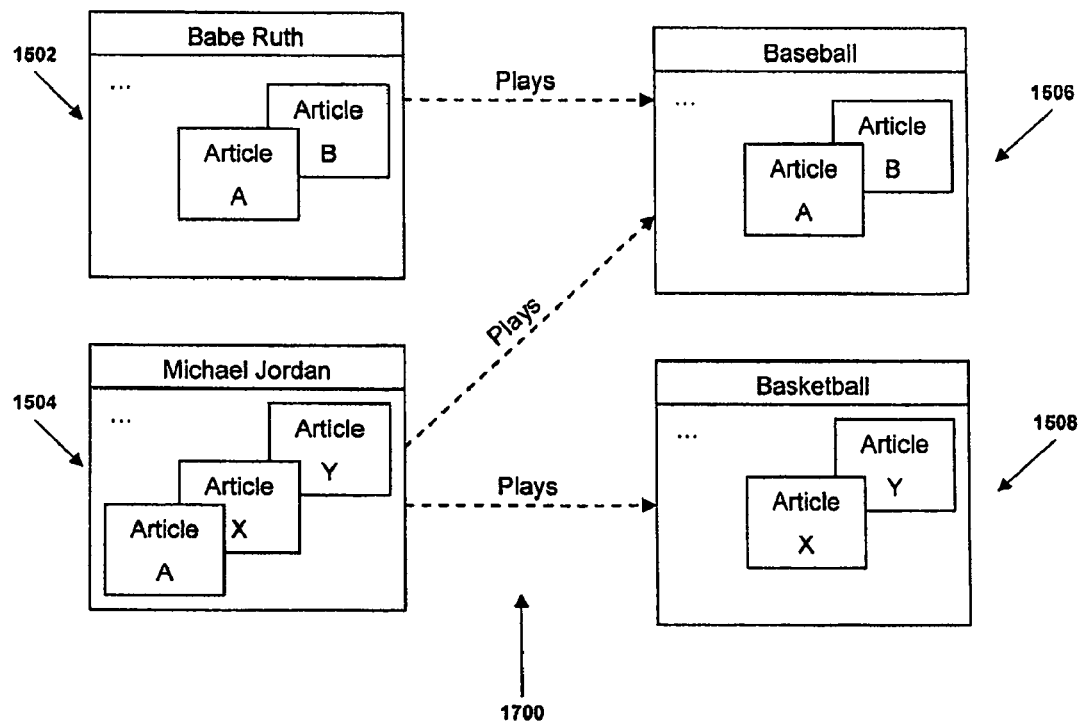
FIG. 16 illustrates one embodiment of a correlation table showing the correlation between the concept instances of FIG. 15.
FIG. 17 illustrates one embodiment of the model of FIGS. 14-16 where relationships between concept instances have been determined based upon the correlation values of FIG. 16.
Figure 19:
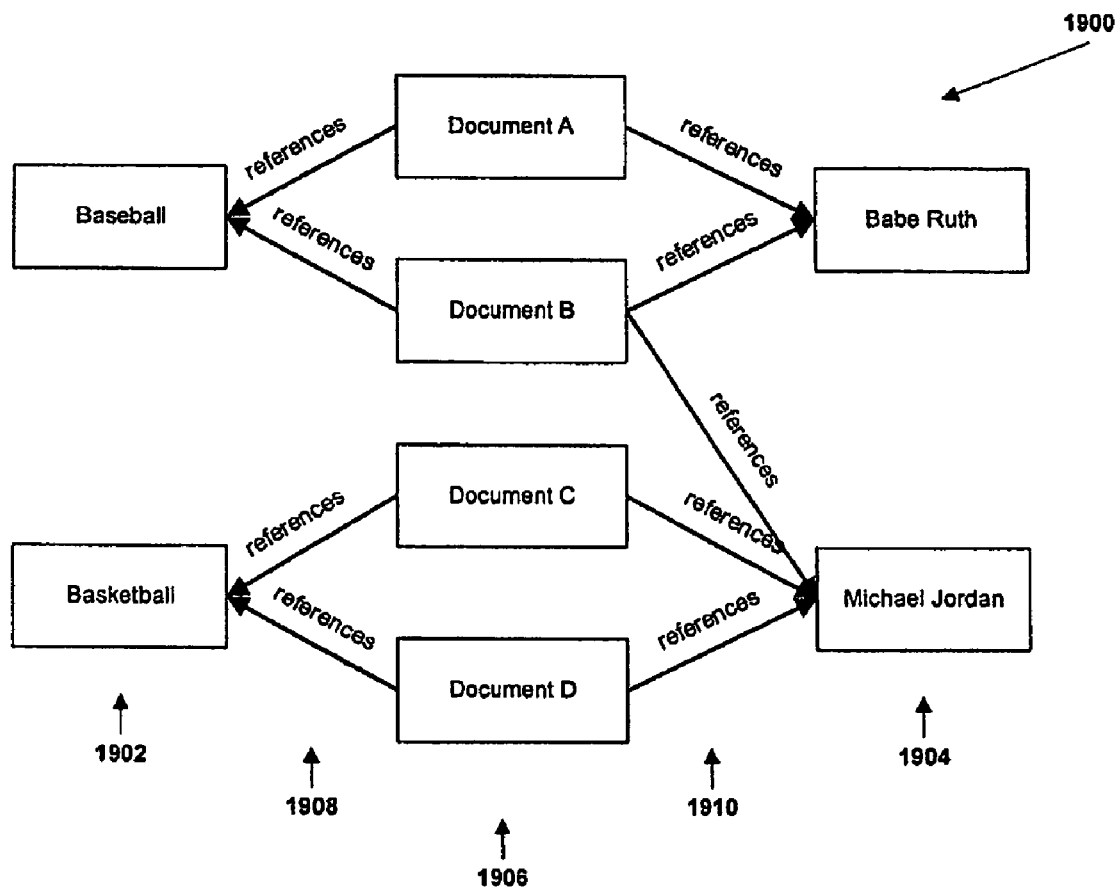
FIG. 19 illustrates yet another embodiment of an ontological model.

In another embodiment illustrated in FIG. 19, an ontology model 1900 also models sports 1902 and athletes 1904. However, in the embodiment of FIG. 19, instead of including explicit relationships between the sports 1902 and athletes 1904, the ontology 1900 models documents 1906, first relationships 1908 between sports 1902 and documents 1906, and second relationships 1910 between athletes 1904 and documents 1906. A system utilizing this ontology 1900 can then infer relationships between each one of the sports 1902 and each one of the athletes 1904. The system can then determine a score related to each of the inferred relationships to compute a relative weighting, as illustrated in FIG. 16. In this manner, a qualitative assessment is determined for each inferred relationship by the system.

The ontology in such an embodiment can be used to draw numerical information from the various sources of information as they pertain to specific components of the ontology. The numerical information generated by connecting or associating the ontology to the content can be referred to as "statistics."

In addition to generating relationships between models of the ontology, and between models and data sources, such a system can also dynamically discover a relationship between a foreign concept or model that does not exist in the ontology and one that does have a model in the ontology. For example, such a system could also discover a relationship between or among concepts that have not been modeled in the ontology (but may be modeled in another external ontology) and concepts that have been modeled in the ontology. If the concept of a home run was not modeled in the ontology, the phrase "home run" could still be queried against the set of articles and then correlated to any of the models in the ontology. Such a system could be configured to compute or discover a correlation to the model of "Baseball" and could determine that baseball may be relevant to the query.

One such method of dynamically discovering relationships and determining correlation between model concepts is described in greater detail below with respect to FIG. 2. However, another such method is illustrated in FIGS. 14-17.

Figure 14:
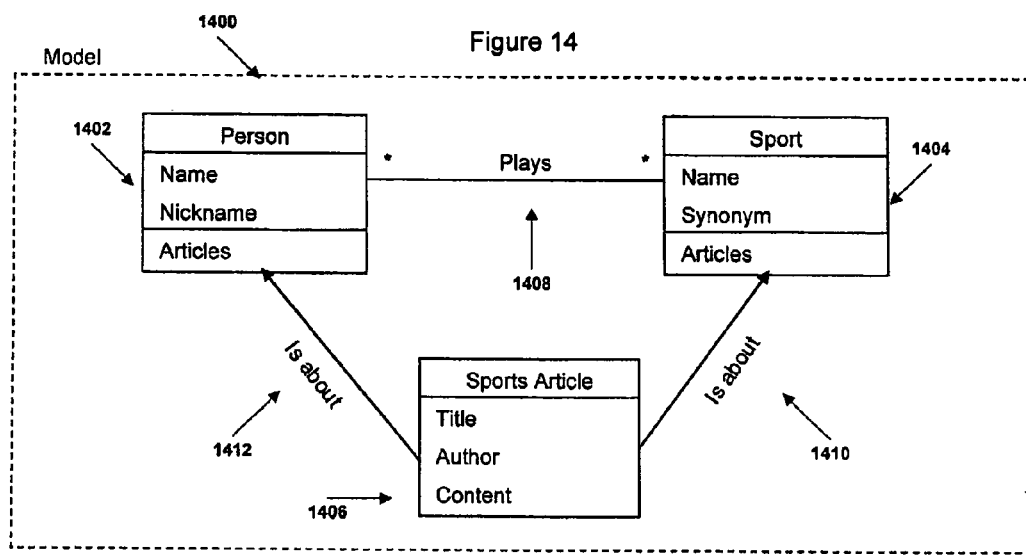
FIG. 14 illustrates one embodiment of model of an ontology that includes three concepts and relationships between the model concepts.

In the embodiment of FIG. 14, an ontological model 1400 includes three concepts 1402, 1404, and 1406 and three relationships 1408, 1410, and 1412 that define the relationships between each of the concepts 1402, 1404, and 1406. For example, the first relationship 1408 defines which person concept 1402 plays which sport concept 1404. The second relationship 1404 defines which sports article concept is about which sport concept 1404. Similarly, the third relationship 1412 defines which sports article concept 1406 is about which person concept 1402.

In addition, each concept 1402, 1404, and 1406 includes a data structure with fields to identify additional information regarding instances of each concept 1402, 1404, and 1406. For example, the person concept 1402 includes fields associated with a person's name, nickname, and article related to that person. Similarly, the sport concept 1404 includes fields associated with a sport's name, synonym, and articles related to that sport. The sports articles concept 1406 includes fields associated with a sports article's title, author, and content.

The fields of the sports article concept can be populated by extracting data from a data source containing information relevant to sports articles. For example, an online sports magazine or newspaper can be automatically monitored, and data source content relevant to the sports article concept 1406 can be automatically extracted to populate its data fields. Methods of automatically monitoring online data sources are well known to those of skill in the art.

Figure 15:
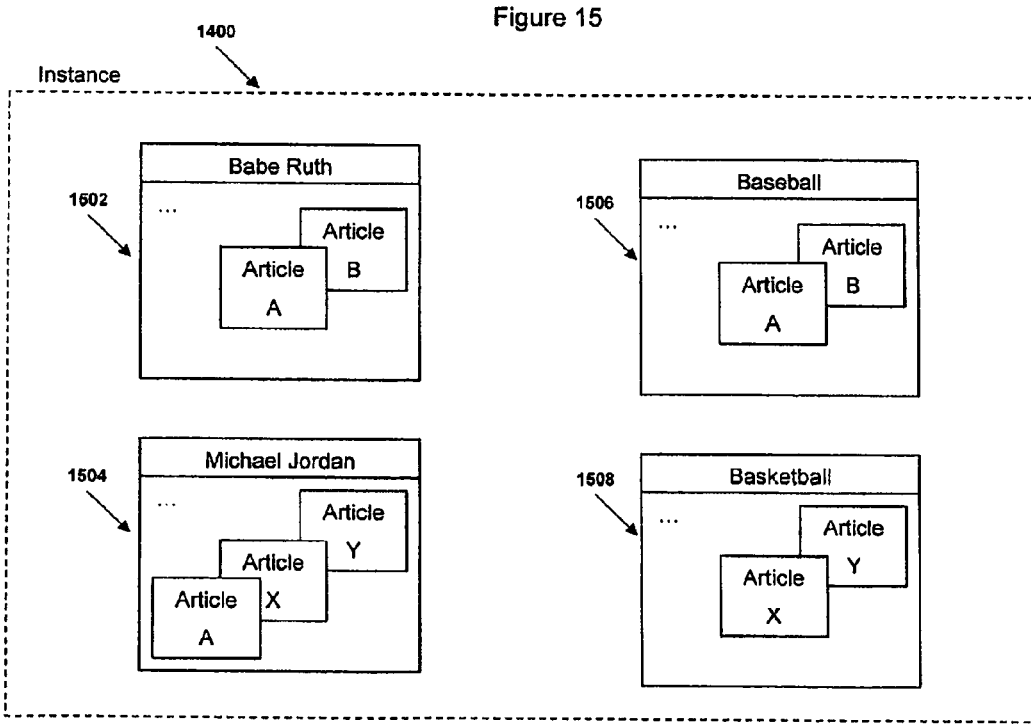
FIG. 15 illustrates one instance of the model of FIG. 14 where three concept instances each include two data source items and one concept instance includes three data source items.

FIG. 15 illustrates an instance of the model 1400 of FIG. 14 where instances of the person concept 1402 and sport concept 1404 have been assigned. In addition, the model 1400 has associated various articles with each concept instance. By using embodiments of a method of the present invention discussed in greater detail below, an ontological system utilizing a model such as illustrated, can infer relationships between the person concept instances 1502, 1504 and the sport concept instances 1506, 1508.

For example, as illustrated in FIG. 16, the ontological system can generate a correlation table 1600 that provides a correlation value between each person concept instance 1502, 1504 and each sport concept instance 1506, 1508. In the illustrated example, the correlation table 1600 indicates: there are two sports articles relevant to both Babe Ruth and baseball; there is one sports article relevant to both Michael Jordan and baseball; there are no sports articles relevant to both Babe Ruth and basketball; and that there are two sports articles relevant to both Michael Jordan and basketball.

Based upon this information, the ontological system can calculate or infer a relationship 1700 between the person concept instances 1502, 1504 and the sport concept instances 1506, 1508, as illustrated in FIG. 17. The calculation can include numerical and/or statistical analysis. For example, the calculation can determine that a relationship exists between model concepts if correlation table values exceed a predetermined or calculated threshold level. Alternatively, the calculation can determine that a relationship exists between model concepts after sorting correlation values to determine relative relevance and selecting a predetermined or calculated number of sorted correlation values. Other calculation methods are described below.

Figure 2:
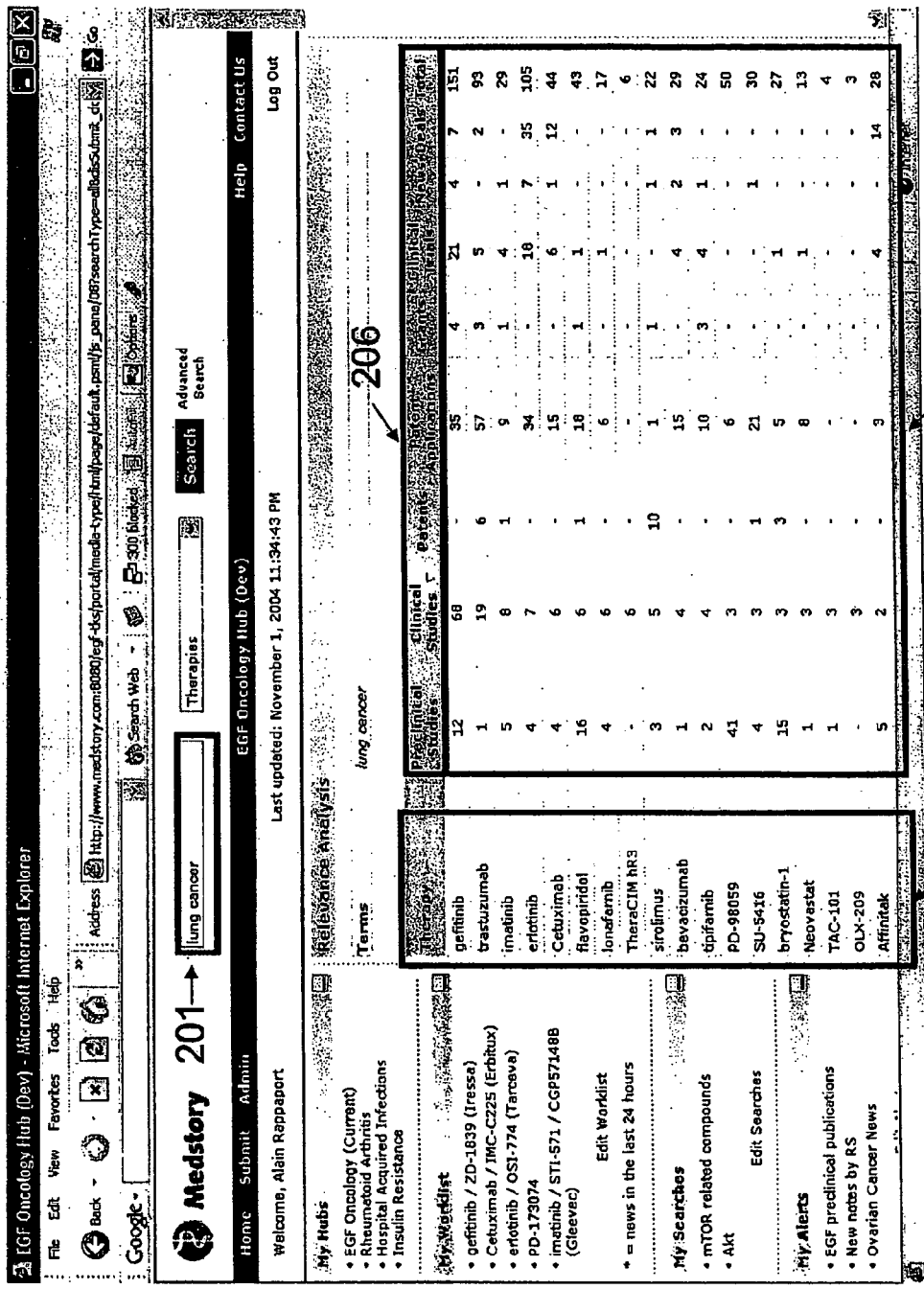
FIG. 2 is a unit-interface displaying statistics extracted from an ontology.

FIG. 2 shows one embodiment of a web-interface 200 displaying the distribution by category or source of documents identified as relevant to a specific search 201 (in this case, the search query "Lung Cancer") in a biomedical ontology. The numerical information 202 can be the number of data source items that are related (e.g., connected) to both therapies 204 and other categories of information 206. Each number and/or series of numbers 202 represent the "statistics" of the ontology component (e.g., drug in a biomedical ontology) associated with a specific information process, such as searching. Each number 202 can be associated with any other information processes as well.

Any of a variety of methods can be utilized to determine the statistics of a particular search. For example, in one embodiment, the statistics include an indication of the relevance of a particular item of information or content within a domain to a particular search query. The relevance can be determined by a calculating a relevance score ($r_{cq}$) for a concept c, given a query q, using i data sources items. In one embodiment, the relevance score ($r_{cq}$)

$$r_{cq} = w(c) \sum_i [w(i) f(h_c, h_q)]$$

where:

w(c)=weighting function for the concept type, c w(i)=weighting function for the data source item, i $h_c$=set of items related to concept c $h_q$=set of items related to query q The term "data source items" is a broad term intended to have its ordinary meaning. In addition, the term data source items can refer to individual entries or particular items of information in a data source, such as a news article in a news information database.

The data source items can be related to a concept using any of a variety of methods. For example, items can be related by manually creating a relationship (e.g., by meta-tagging the data source item with the concept name) or using an automated method, such as by automatically searching the data source items for concept names and creating the relationships based on the search results.

Similarly, the data source items can be related to a particular query by executing the query as a search against the data source items and considering the matching results to be related.

Any of a variety of normalized score functions, $f(h_c, h_q)$, can be used as well. For example, the score could be represented by:

$$f(h_c, h_q) = (\text{similarity score})(z)$$

where:

$$z = |h_{cd_i} \cap h_{qd_i}|$$

$$\text{similarity score} = \frac{|h_{cd_i} \cap h_{qd_i}|}{|h_{cd_i} \cup h_{qd_i}|} = \frac{z}{|h_{qd_i}| + |h_{cd_i}| - z}$$

Thus, in one embodiment, the overall concept score reduces to:

$$r_{cq} = w(c) \sum_i w(i) \frac{z^2}{|h_q + h_c| - z}$$

By comparing the relative scores for concepts of one type (e.g., only comparing drugs), the weighting function of the concept type $w(c)$ can be ignored, which further simplifies the method. Similarly, when using only a single data source, the weighting function of the data source item $w(i)$ can be ignored.

Alternative similarity scores can further modify the method. For example, in cases where generally z and the set $h_{qd_i}$ is small for a given query compared to the number of items in the set of related data source items to the concept ($h_c$), a simplified similarity score can be used:

$$\text{similarity score} = \frac{z}{h_c}$$

In one simple case, where:

$$f(h_c, h_q) = 1$$

the relevance score simplifies to:

$$r_{cq} = w(c) \sum_i w(i) z$$

When comparing two concepts to determine whether a relationship exists between the two concepts, $r_{cc}$, a similar algorithm can be used with i data sources:

$$r_{cc} = w(c_1, c_2) \sum_i w(i) f(h_{c_1}, h_{c_2})$$

where:
$w(c_1,c_2)$=weighting factor for the concept types of $c_1$ and $c_2$
$w(i)$=weighting factor for the data source item i
$h_{c_1}$=set of data source items related to concept $c_1$
$h_{c_2}$=set of data source items related to concept $c_2$
$z = h_{c_1} \cap h_{c_2}$ Any of a variety of functions can be used for $f(h_{c_1}, h_{c_2})$, as discussed above. Threshold values may be set to establish binary relationships (relationships that either exist or don't exist). These threshold values may be established by machine learning methods, or scores represent the strength of the relationship. Alternatively, scores may represent the strength of a relationship, or statistical methods such as a chi-squared analysis may be used.

The weighting functions, $w(c1,c2)$, $w(c)$, and $w(i)$ can be established using any of a variety of methods, or combination of methods well known to those of skill in the art.

In one embodiment, the weighting function $w(i)$, can vary not by individual data source item but by data source, with values established for each data type. Alternatively, the weighting function can depend on a data source item's properties, such as the item's recency, with more recent items receiving a higher weight or older items being given a weight of zero, thus excluding them from the relevance score.

One method of calculating or establishing weighting factors includes machine learning algorithms or methods (such as, but not limited to, supervised or unsupervised learning, etc.).

Another method of establishing weighting factors can include manual adjustment depending, for example, on how important the source should be in determining the relevance scores. Importance can be determined based upon the identity of the user. For example, if the user is a researcher searching for biomedical research information, data source items such as articles can be classified as more important than other data source items, such as patents. In addition, a user can manually assign an importance to data sources.

In another embodiment, weighting factors are established according to a user's preferences. The preferences can be established directly by a user or they can be learned by monitoring the user's behavior. For example, if a user frequently reviews a particular data source type, that data source type can be assigned a stronger weighting factor.

In another embodiment, weighting factors are established for different types of users. For example, one set of weighting factors can be assigned to a user of a healthcare system who is a healthcare professional (perhaps valuing clinical document sources more highly) and a different set of weighting factors for patients (perhaps valuing consumer-oriented information more highly).

After relevance scores have been determined for one or more concept types, the concepts deemed highly or more relevant can then be combined with the query to form a supplemented query. The supplemented query can then be used to query one or more data sources, as discussed in greater detail herein. Therefore, for any given ranking algorithm for a search engine, the ranking algorithm can be supplemented using the data about concepts relevant to a given query. For example, a search system or an ontological system can determine which concepts are relevant using any of the methods described above.

Thus, in one embodiment, the ontological system 100 can include:
1. concepts which can be explicitly modeled (e.g., an ontology with models representing entities);
2. data source content related to a domain; and/or
3. one or more tools to:
   a. automatically establish relationships between models and data sources;
   b. automatically establish relationships between models based on content of the data sources; and/or
   c. automatically establish relationships between external entities (non-modeled or modeled in other ontologies) and models in the ontology, using the data sources.

In addition to automatically generating relationships, relationships can also be created manually or added into the ontology, and those relationships can also be used in making inferences or generating statistics, as will be described in greater detail below.

In one embodiment, the ontological system 100 uses an ontology based on a domain to enhance the search and analysis of documents in sources, for example, on the World-Wide Web and/or Internet as performed by traditional search engines, such as those that match text queries to text indices. This can include the domain processing system 101 working either in conjunction with a preexisting free-text or structured search service 105 using a specialized or customized free-text search service, or both as will be described in greater detail below. In one embodiment, more than one search service is used by the domain processing system 101 such that it can determine which service to use and combine results according to domain- or user-specified rules. In one embodiment, structured search services (such as searching specific fields in documents), searching structured documents, may also be available.

Figure 3:
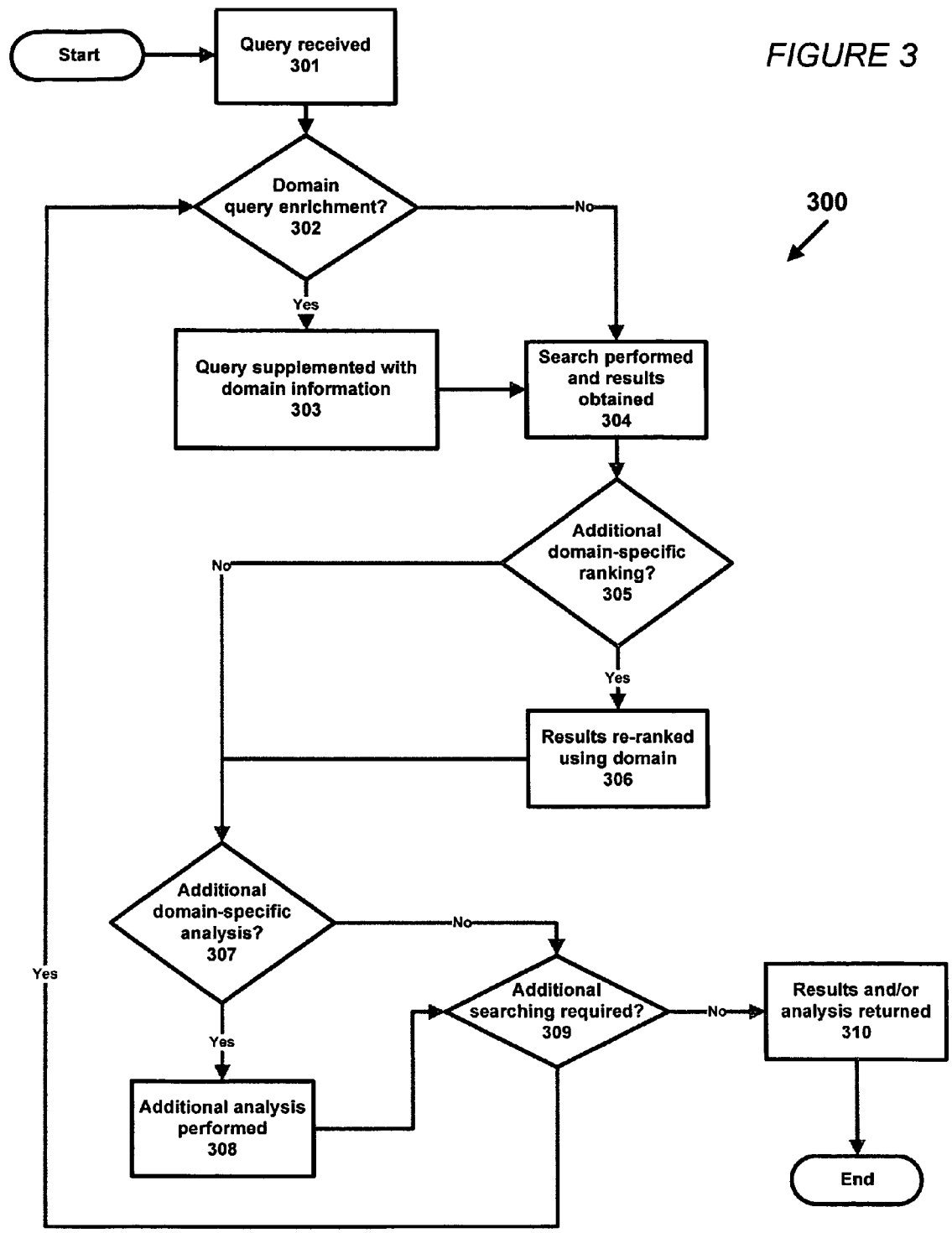
FIG. 3 is a simplified flowchart showing the processing of a search request with one embodiment of the present invention.

Searching with a search service 105 can be enhanced with an ontology 102, as outlined in FIG. 3. The method 300 can begin with a query being received from a user at step 301. A query can include words or phrases in a structured query syntax, unstructured text, or data in any format. After a query is received at step 301, the method 300 can determine if it is desired to perform a domain-specific enrichment of the query using the ontology at step 302. If enrichment is desired, the method 300 proceeds to step 303, where the query may be enriched according to user preferences or a user's role in the system. For example, if the domain is medical in context, the enrichment may vary if the user is a doctor, a scientist or a patient. Enrichment can also depend upon the query, the ontology, or other factors, including system settings. The method 300 continues at step 304 where a search is performed. Search tools can be used at this step 304. The results are retrieved for processing (and/or optionally stored for later processing). The search tools can include, but are not limited, to web search tools, merchandise search tools (e.g., books, music, autos), specialized search tools (e.g., advertisements, images, videos), and domain search tools (e.g., medicine, finance, sports, travel).

At step 305, the method 300 determines if the results of the search are to be analyzed by the system and if additional domain-specific processing of the results is to be performed. Additional processing is performed at step 306 and can involve analyzing the results to re-rank or eliminate some items from the results that do not fit additional domain-specific criteria. Alternatively, at step 306 the method 300 can boost the ranking of items that more closely match domain-specific criteria as extracted from the ontology, such as increasing the score of items that also match a high number of related models related to the query. For example, in the medical domain, ranking a scientific paper that discusses several drugs relevant to the query higher than a paper that only discusses one drug relevant to the query.

The method 300 then determines if additional domain-specific analysis are to be performed on the search results or the query itself at step 307. Additional analysis may be performed on either the query or the result set at step 308. For example, in one embodiment, the method 300 determines how the search results are connected to items in the ontology. At step 309, the method 300 then determines if the additional analysis requests additional searches to either refine the search or extract further information. If additional searching is requested, the method 300 returns to step 302.

A single-pass analysis of results may be sufficient in some cases, in which case the method 300 continues to step 310. Alternatively, the cycle of querying and analysis can continue or repeat until a steady-state of results is obtained, or until a predetermined state is reached. Eventually the final result set and/or the analytic results are assembled and returned to the user or saved by the system at step 310.

Figure 4:
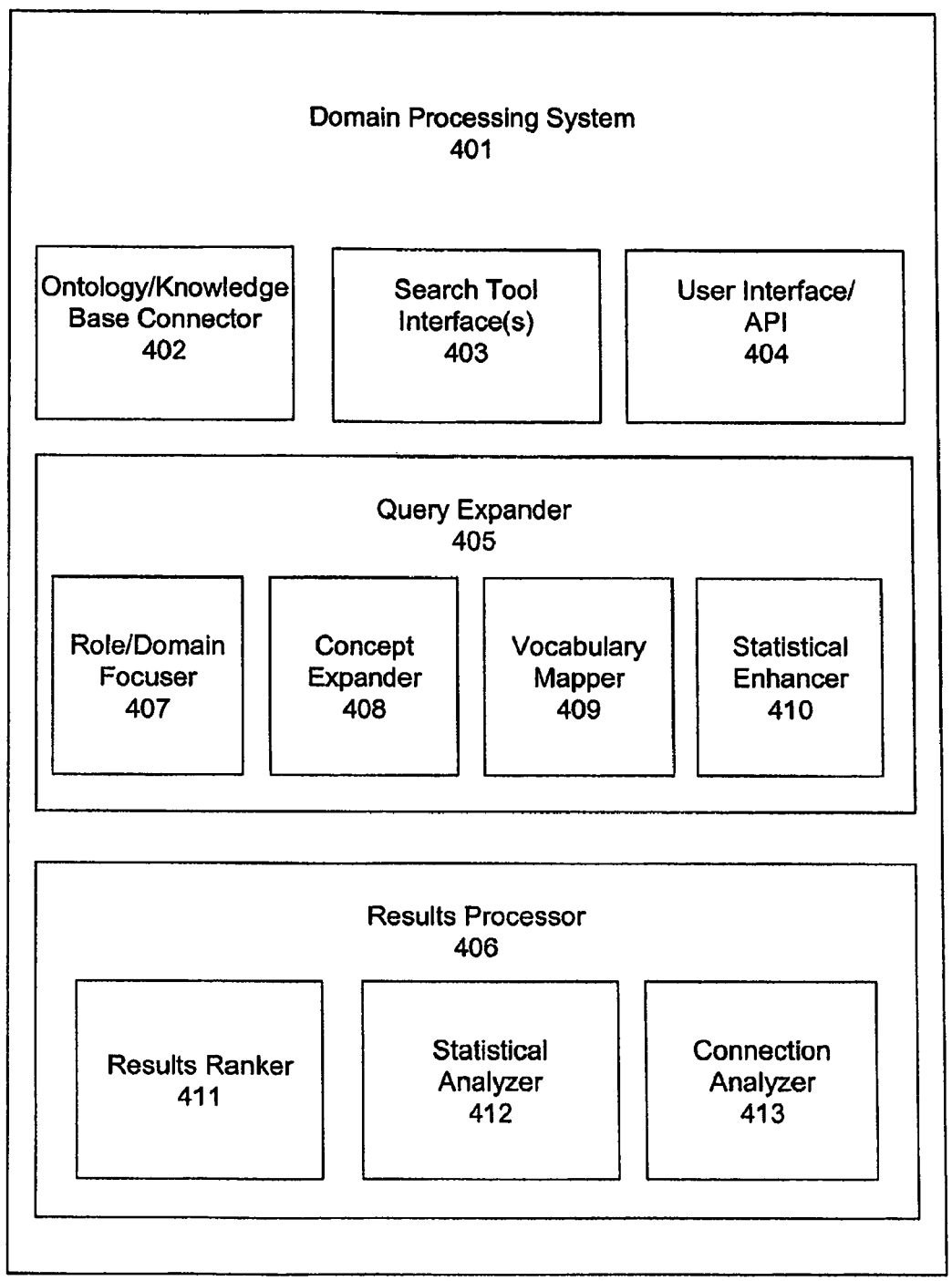
FIG. 4 is a simplified block diagram showing some components of the domain processing system.

One embodiment of a domain processing system is shown in FIG. 4. In one embodiment, the domain processing system 401 can include an ontology/knowledge base connector 402, one or more search tool interfaces 403, a user interface and/or API 404, a query expander component 405 and a results processor 406.

In one embodiment, a ontology connector 402 connects to and extracts information from the ontology. Other components use this component to access domain information or other information stored in the ontology. In addition, one or more search tool interfaces 403 is available for the domain processing system 401 to invoke one or more search tools to perform free text queries or other searches.

In one embodiment, a query expander 405 modifies an input query in a domain-specific manner using information from the ontology connector 402. The query expander 405 can have subcomponents responsible for particular analysis and modification of the input query as described below.

In one embodiment, a role/domain focuser 407 of the query expander 405, adds to the query or otherwise modifies the query depending upon the role of the user or to otherwise increase the quality of the result set. For example, in the health care space, if the user is a patient looking at treatment options, the focuser component uses statistics to append the names of all of the drugs and other treatments to the query as an ORed string. The names of all the drugs might further be expanded in ORed fashion to include all synonyms, trade names, generic names, project names, etc. This can include the use of a vocabulary mapper 409 in this process. For example, if a user provides a query for a medical treatment "x," the role/domain focuser 407 can supplement the query with the names of drugs "y" and therapies or treatments "z" that are known by the system to be treatment options to "x." The resulting query in this case may then be the initial query appended with the string:

x AND (y OR z OR . . . )

where x, y, and z represent treatment names in the ontology. In another example, the focuser component 407 may be attached to an ontology about European Football. In this case, the focuser may append the following string to the search input by the user:

"European football" OR soccer

Figure 5:
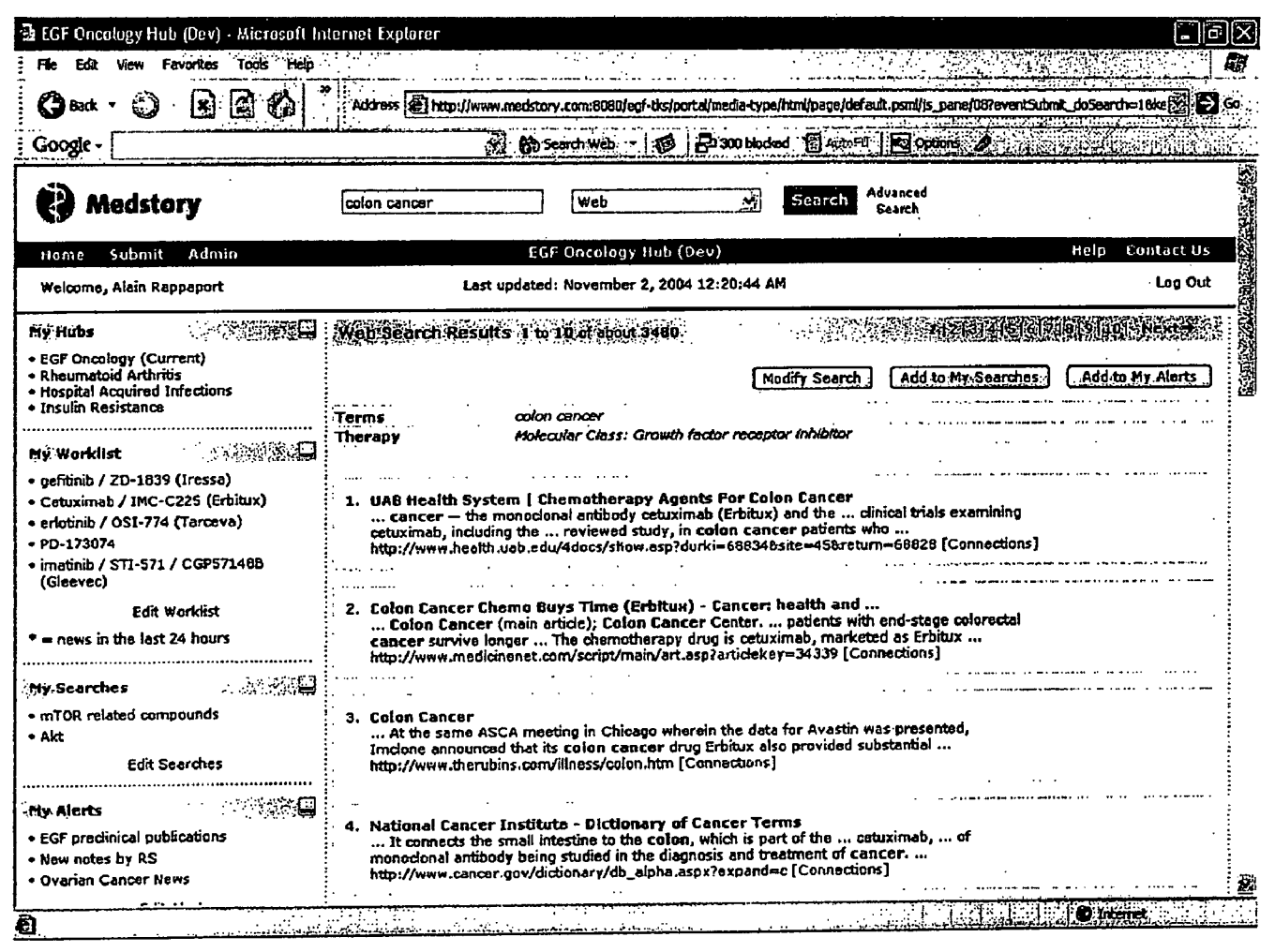

In one embodiment, a concept expander 408 component expands a query based on related concepts in the domain to include matches that indirectly fit the query criteria. For example, a user interface may allow in a biomedical domain that a molecular class of a compound be specified in a search. Rather than do a free text search on just the name of the class, which is likely not standardized in any free text repository, the query may be expanded to include names of compounds that are known in the ontology to be of that molecular class. One embodiment of a user-interface showing results of a search that allows the user to refine a query based on data extracted from an ontology is illustrated in FIG. 5.

Referring back to FIG. 4, in one embodiment, the vocabulary mapper 409 uses the domain ontology/knowledge base to map common terms to synonyms. For example, a user's query involving a generic name of the drug may involve searching the ontology to find and inject any project or commercial names of the drug into the query.

In one embodiment, a statistical enhancer 410 targets the result sets of a query to the most pertinent, domain-centric results by injecting statistically significant terms based on frequency analysis or co-occurring keywords from the ontology. For example, a search with the term "treatment" in the domain of ovarian cancer may append the top occurring treatment names as determined using content within the ontology using the statistics.

Figure 6A:
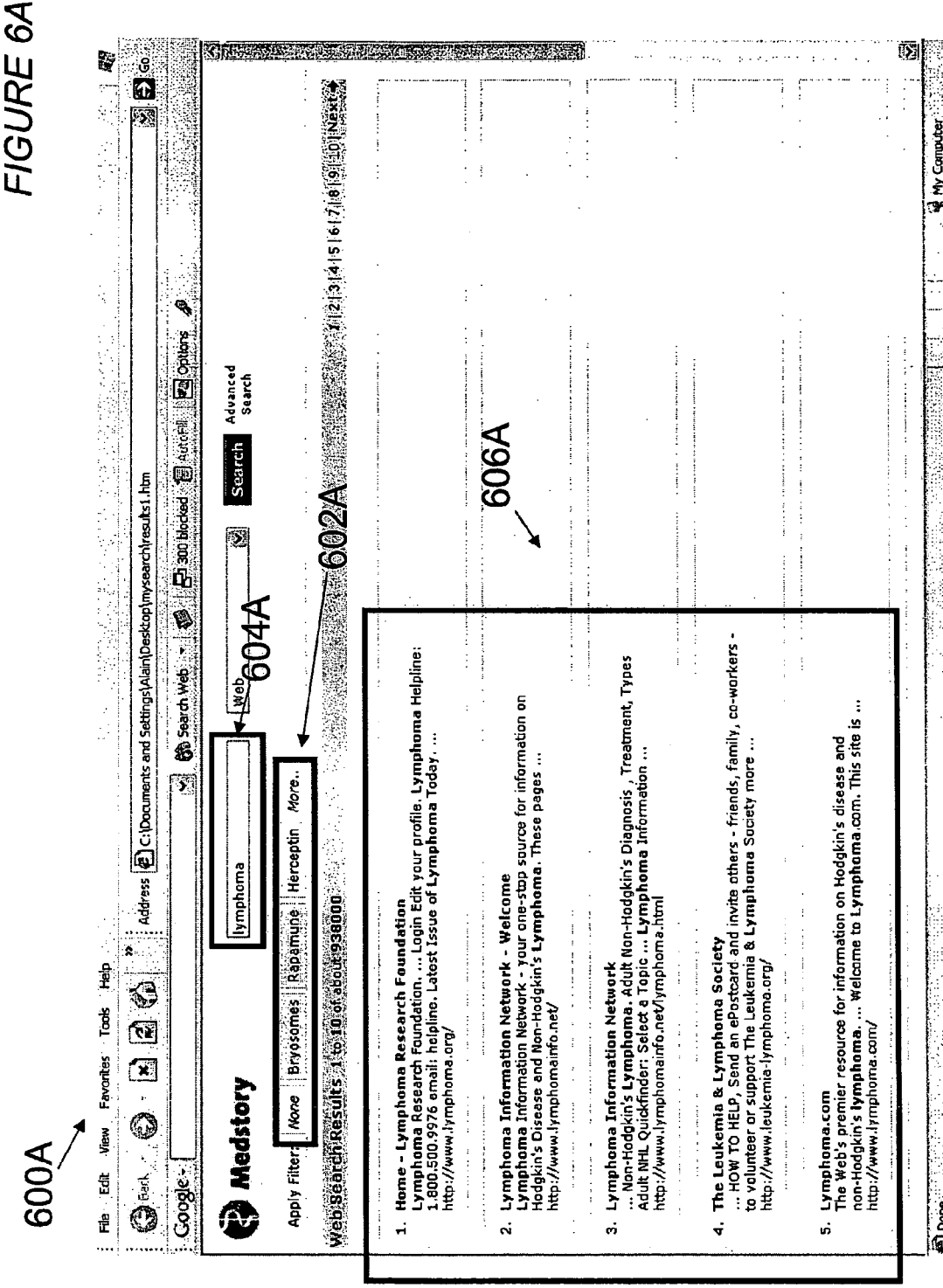
FIGS. 6A-6C are user interfaces showing search results, which allow the user to refine or focus a query based on data extracted from an ontology.
Figure 6B:
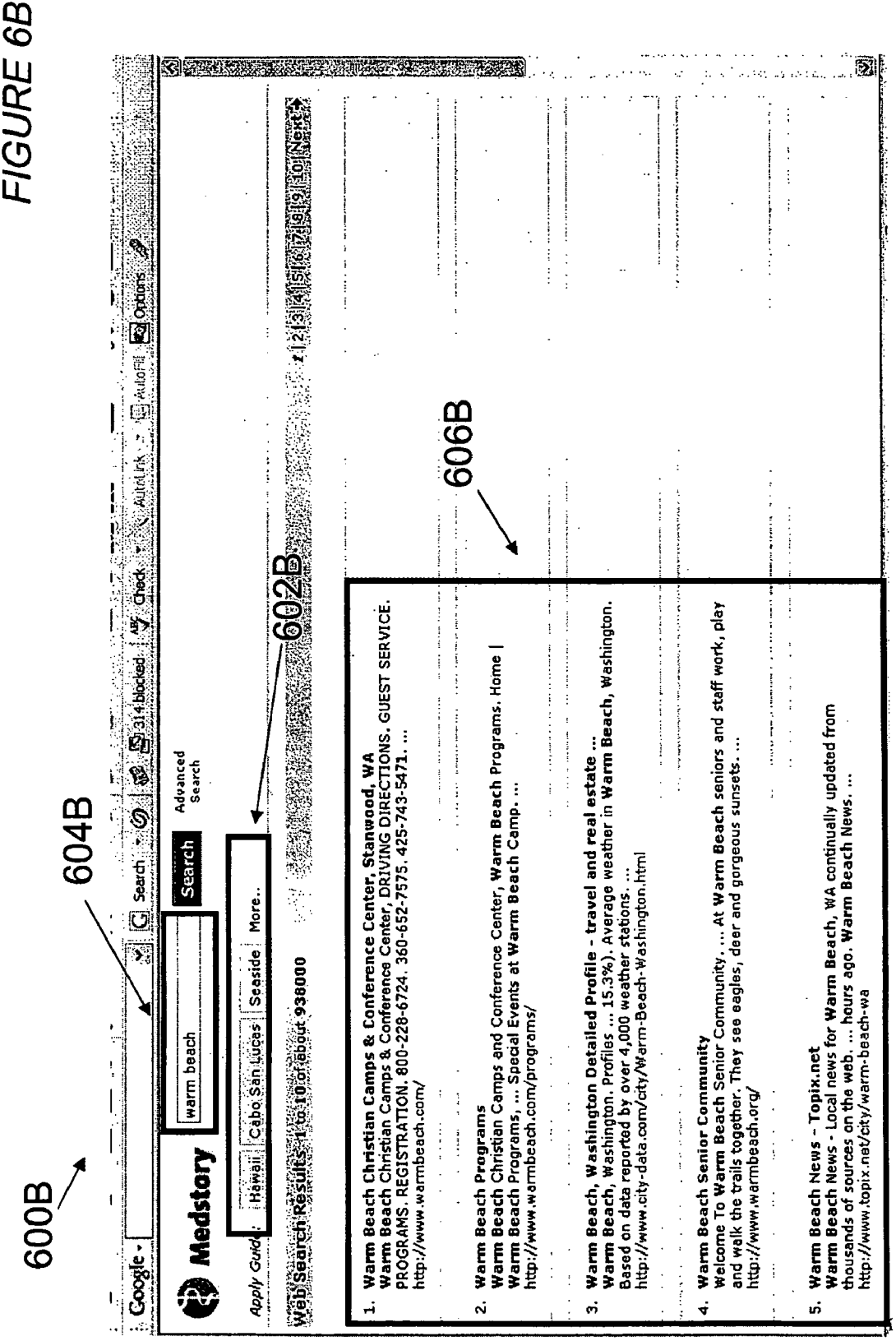
Figure 6C:
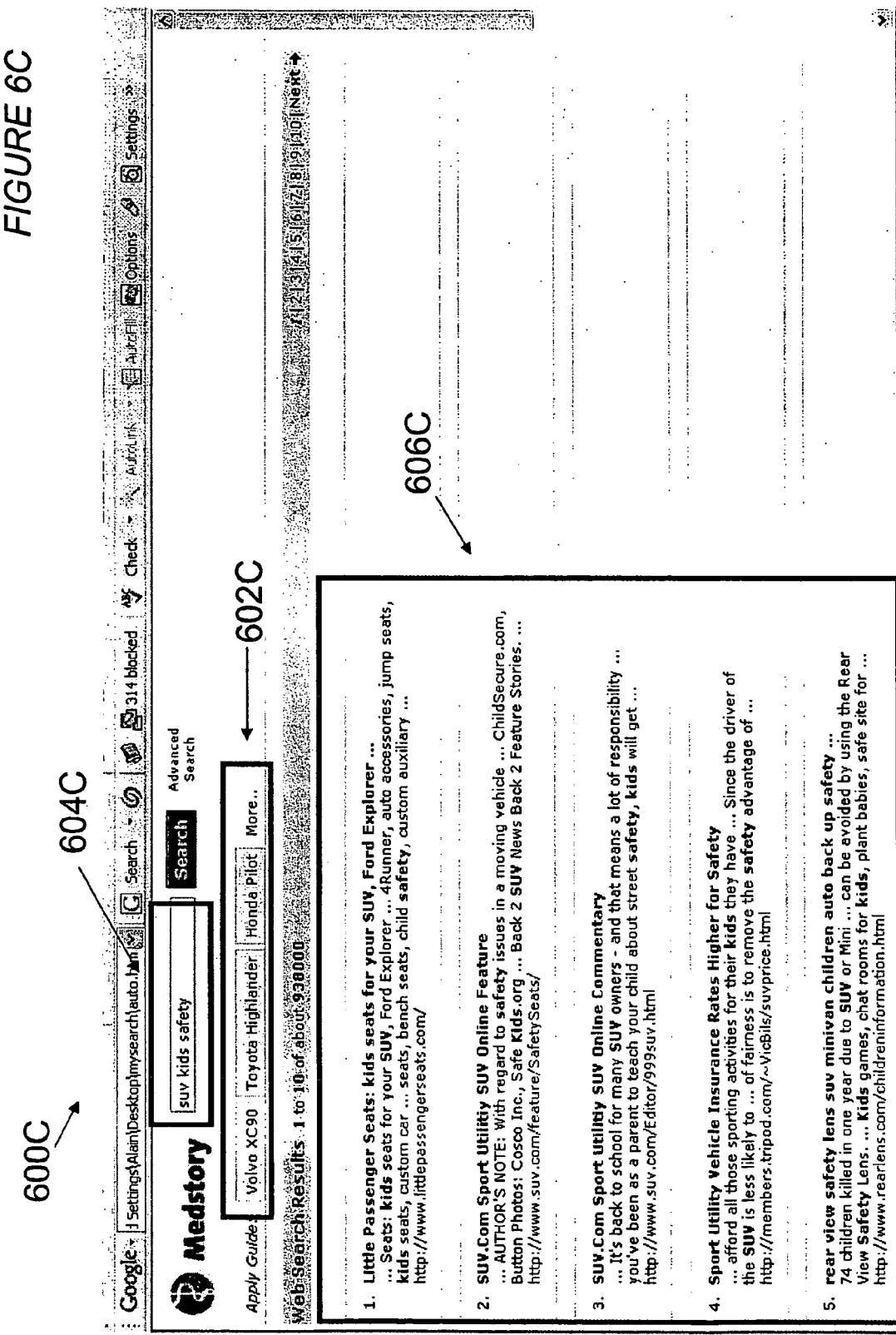

In one embodiment, the query originally designed for another search service is executed in the ontology. The ontology search generates a number of results on which statistics are calculated to identify, for example, the top three treatments relevant to the query. These treatments may, for example, then be added to the original query to increase its focus, or, for example, will be presented as guiding terms (as shown in FIGS. 6A-6C) that can be added to the query to enhance the quality of the results. The statistically or numerically derived new terms allow the search to be focused, increasing specificity and chance of identifying relevant information. In one embodiment, the relevant concepts may be presented to the user such that they can choose to refine their search with the relevant concepts.

For example, in FIG. 6A, the user in a biomedical hub or domain is presented with a user interface 600A that includes therapies 602A that most strongly correlate to the query 604A according to a search of the content within the ontology. The therapies 602A identified by the system utilizing the user interface 600A are not only useful data; in addition, the user can then use or select one or more of the therapies 602A to refine the query 604A and focus or direct the search results 606A to more relevant information. Focused searching can be other domains as well.

FIG. 6B shows a user interface 600B presented to a user in a domain related to travel information. The user interface 600B includes guides or filters 602B that have been identified by an ontology as relevant and/or correlated to the user's search query 604B. The filters 602B provide the user with additional informational categories relevant to his search query 604B. The user can select one or more of the filters 602B to refine the query 604B and focus or direct the search results 606B to more relevant or desired information.

Similarly, FIG. 6C shows a user interface 600C presented to a user in a domain related to automobiles. The user interface 600C includes guides or filters 602C that have been identified by an ontology as relevant and/or correlated to the user's search query 604C. The filters 602C provide the user with additional informational categories relevant to his search query 604C. The user can select one or more of the filters 602C to refine the query 604C and focus or direct the search results 606C to more relevant or desired information.

Referring again to FIG. 4, a results processor 406, in one embodiment, processes the response of the search request from the search tool(s). In one embodiment, the results processor 406 processes results to further refine queries before returning the results to the user, or it may simply process the results for analysis. The results processor 406 can include various sub-components, such as a results ranker 411, a statistical analyzer 412, and/or a connection analyzer 413 as described below.

In one embodiment, a results ranker 411 reorders results from the search(es) if applicable. This step may be optional, as a search tool may have already provided this service or may use an ordering sufficient for the user. If more than one search tool is used, the results may be merged according to the user's preferences or ranking algorithms determined using the ontology by the results ranker 411. The results ranker 411 can, for example, rank documents in a healthcare domain based partially on the number of compounds in the ontology that the document mentions and their query statistics (statistics generated by executing the query in the ontology). The search results may not contain sufficient information about the result set returned for an adequate ranking, in which case the ranker must retrieve required information either by retrieving the document itself, a cached version of the document from the search service, or may retrieve the information required by other means.

In one embodiment, a statistical analyzer 412 performs statistics on the result set and/or the ontology to return to the user or record in the system. An example of the analysis may involve a calculation of the number of items internal to the ontology with matches to the query as well as similarity or comparison analyses between the result set and items internal to the ontology. In one embodiment, the results ranker 411 may use the statistical analyzer 412 in the process of re-ranking or modifying the result set.

In one embodiment, a connection analyzer 413 analyzes the returned result set to link the result set to concepts or items in the ontology so that the user can easily navigate to those items or visualize the concepts involved. This function may further allow the user to correlate items with search results. For example, a search on advanced stage ovarian cancer may correlate highly with certain experimental compounds which the user may wish to further investigate. In addition, this function may allow the user to easily refine their search by integrating connected concepts into their subsequent queries.

Figure 7:
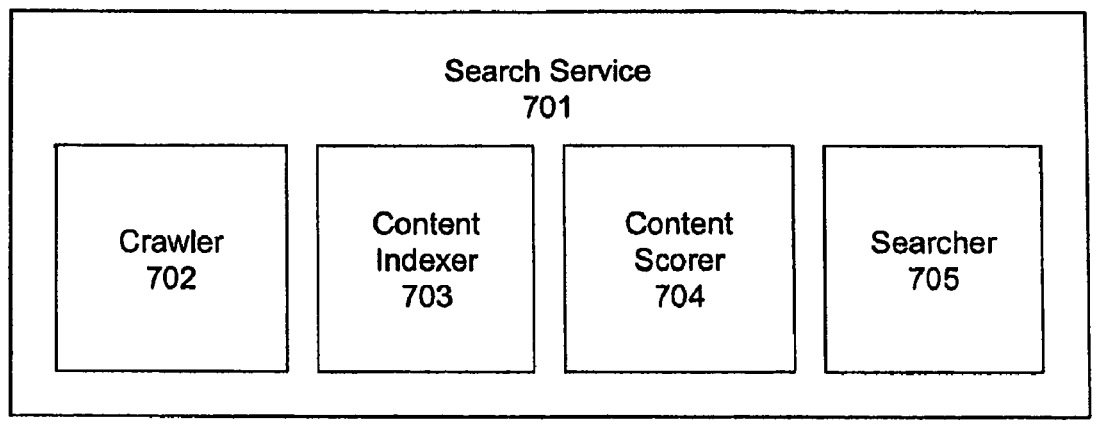
FIG. 7 is a simplified block diagram showing components of the search processing component of the present invention.

The search tool components can include externally available, general search engines or alternatively, in one embodiment, can be a domain-specialized search engine, as shown in FIG. 7. In one embodiment, the search service 701 is integrated with the domain processing system 401 such that the search components have available the analysis and ontology access components. Alternatively, the search service 701 can directly access the ontology.

In one embodiment, a crawler 702 determines a subset of the web or other data sources appropriate for indexing based upon the ontology. The content indexer 703 may also selectively index documents by analyzing them according to domain inclusion criteria. The content indexer 703 can also create domain-specific indexes according to the knowledge-base or ontology. For example, the indexer can create an index in a biomedical domain for compounds that appear in the document.

In one embodiment, the content scorer 704 may use a scoring algorithm that is dependent upon the domain. For example, in a biomedical domain, a higher score may be given to documents that refer to more compounds. The searcher component 705 can also be customized to search domain-dependant indexes in accordance with the content indexer.

In one embodiment, domain processing system 401 can use a templating system similar to that described in WO 03/077142, which is incorporated by reference herein, to describe rules for domain focusing, vocabulary mapping and concept relaxation, as described below. The templates or selectors, created for an object-orientated ontology, allow for the description of what properties in the ontology are related to other properties in the ontology. Such templating systems allow the description of these rules on a per-user basis, and are extensible for allowing different users and/or user roles that incorporate new rules for processing queries.

For domain focusing, the template can be used to unambiguously describe properties that are to be added to a query to focus search results. For example, FIG. 8 illustrates embodiments of templates 801, 802, 803 used in a biomedical domain application.

In one embodiment, a compound template 801 indicates that all compound names (e.g., the compound's generic, project and commercial names) be used in the focusing query.

For vocabulary mapping, the templates can define what properties are equivalent and should be appended to any matching terms. For example, in a biomedical domain, a compound template 802 could indicate that all compound names be expanded.

Concept relaxation can also be described by templates, which can define what properties should be added into a query. For example, in a biomedical domain, a query on a compound's mechanism of action could be supplemented by adding the compound names to the query by using a template 803.

Templates can be used to focus information in any domain, including those outside of biomedical domains. In addition, the templates can specify rules for processing statistics generated to determine relevant content.

The domain processing system 401 can act as a conduit to search content sources outside of the ontology, and it can also act as a source of information to incorporate to the ontology. The documents returned from searches can be analyzed in conjunction with pre-existing or seeded data to incorporate the new content into the ontology. For example, in a biomedical or domain, news articles found to be connected to compounds could be added as additional information to the ontology itself. In another embodiment in the biomedical domain, new companies or compounds could be detected using queries assembled from the seeded database.

An example illustrating many aspects of the system may be useful. While the system could be used in conjunction with any search-based service, the following example uses this system with a book search engine to create a more powerful book search platform.

Such a platform could have several parts including a database of books that might contain the title and author of each book, an algorithm for matching a user's query to books that are relevant, and an algorithm for ordering the matching books by their degree of relevance. If a user submits a query to this platform for "Michael Jordan," a reasonable result may be a list of books with the phrase "Michael Jordan" in the title or written by the author "Michael Jordan." These books could be ordered by some measure of relevance, possibly by the number of sales or by the latest publication date. Similarly, if a user submits a query to this platform for "slam dunk," a reasonable result may be a list of books with the phrase "slam dunk" in the title, ordered by some measure of relevance.

An ontology system built according to this invention could assist such a platform with any or all of these parts in a knowledge domain. Multiple ontology systems could assist such a platform in several knowledge domains. Continuing with the example in the sports domain, a book search platform could use the concepts modeled in the sports ontology system to tag books in its database so that books that do not have the phrase "Michael Jordan" in the title would still be associated with the model of "Michael Jordan." Now when a user searches for "Michael Jordan" they will receive more results because the ontology system has assisted the search platform in finding relevant results.

A book search platform could also incorporate the sports ontology system to assist its algorithm for matching a user's query to books that are relevant. First, the sports ontology system could provide one or more additional queries based on the concepts in the ontology. These queries could include but are not limited to words or phrases. If a user submits a query to the platform for "Michael Jordan," the system might return an additional query for "Air Jordan" because the phrase is described as a nickname in the model for "Michael Jordan." In this case, the book entries themselves do not need to be tagged with meta-tags or keywords. In addition, the sports ontology system could provide one or more additional queries based on relationships in the ontology. If a user submits a query for "slam dunk," the system might return the following two additional queries: "Basketball" and "Hoops." "Basketball" may be returned because the system discovered a correlation between "slam dunk" and the model of "Basketball" and "Hoops" may be returned because the word is described as a slang term for the model of "Basketball."

A book search platform could also incorporate the sports ontology system to assist its algorithm for ordering the matching books by their degree of relevance. First, if different subsets of results were retrieved based on additional queries generated by the system, the ordering of these queries by their degree of correlation could be used as part of the ordering algorithm for the books. Second, the titles and authors or each matching book could be analyzed by the sports ontology system for their correlation to any concepts in the ontology and scored. The books would then be ordered according to their relative scores.

Figure 9:
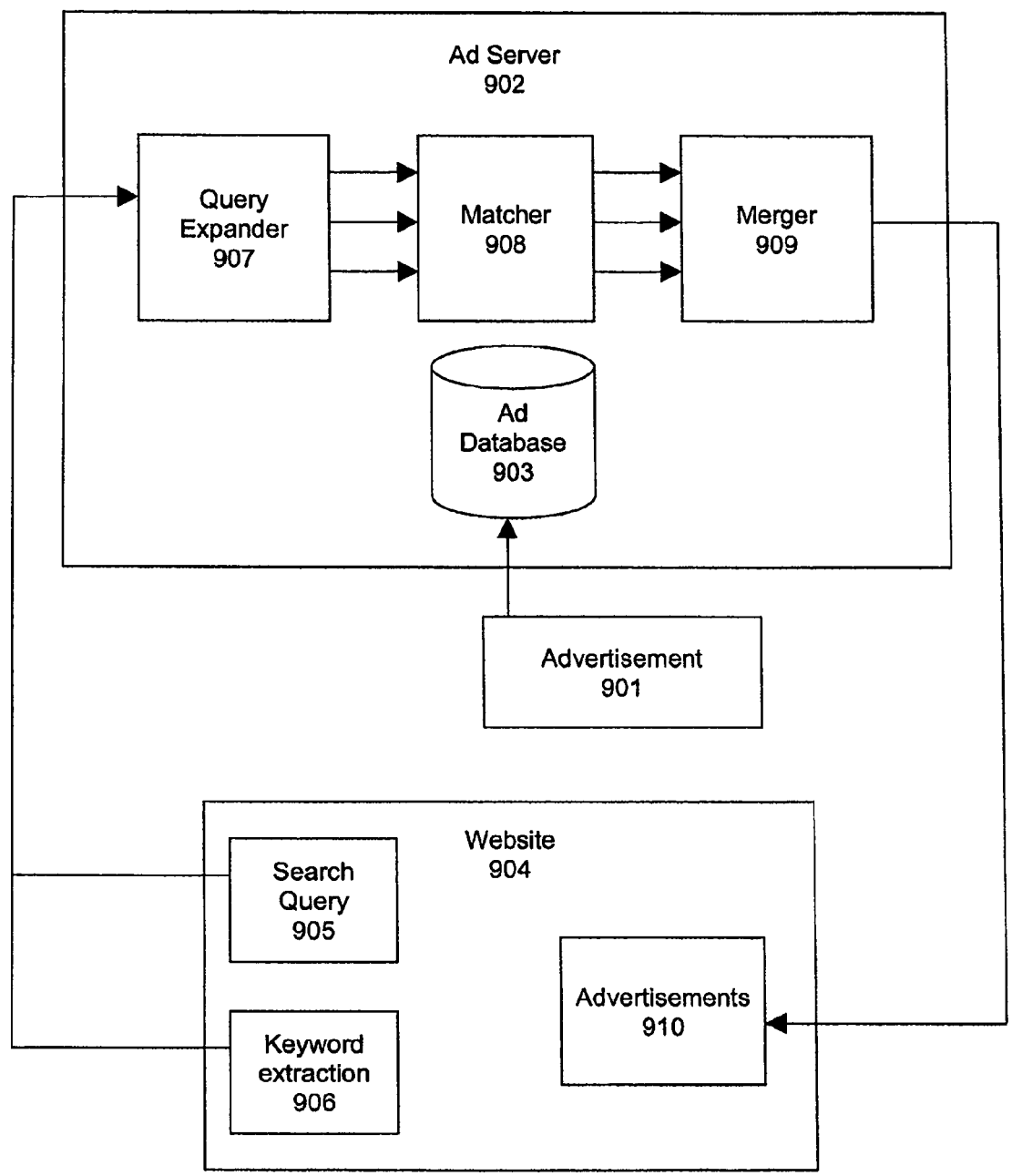
FIG. 9 is a block diagram of an online advertising system that uses an ontological processing system to determine targeted advertisements to display to end-users.

The uncovering of concepts using the system may also be used to improve online advertising systems. An example of an online advertising system is shown in FIG. 9. In this embodiment, an advertiser can submit an advertisement or advertisement campaign 901 to the ad server 902 which then gets stored in an ad database 903. The advertiser may enroll the advertisement(s) 901 using either traditional characteristics such as certain sites, or a category of sites that have been categorized by the advertising system, certain keywords, certain profiled user information, etc. However, the advertiser could also, in addition to such traditional approaches, enroll the campaign into general concepts related to that given domain.

For example, in a medical context, the advertiser might choose to have an advertisement 901 displayed for all queries that are related to a given drug or condition. The ad server 902 can then use statistical enhancer 410 (with an ontology linked to domain content sources) to determine when a relative query, user profile, and/or page or site content match a given concept that has been subscribed to by the advertiser.

In one embodiment, the system can assist an advertiser in choosing to display advertisements on specific websites or specific web pages, which may be part of an advertising network. In one scenario, the sites or pages could be found using a query using a search system previously described that searches the sites available in an advertising network or other index, including search results from a search engine. This may or may not include, for example, the ability to refine the search according to certain concepts as uncovered by the statistical enhancer 410 for the advertiser's supplied search query and/or other advertiser supplied information (e.g., advertiser's name, type of product being advertised, intended demographic of audience, etc.).

A website 904 using an advertising engine may request advertisements using various techniques to query the ad server for an appropriate set of advertisements to display. In one approach to online advertising, typical of search websites, a user's search query 905 is sent to the ad server 902 to retrieve advertisements. In another type of advertising approach, usually for web pages that have content that is not shown in response to a user query, the ad server can use keywords 906 extracted from the content of the page to determine appropriate content. This process to determine a key set of words for a given site or content may be done as part of the advertising engine's services.

In one embodiment, regardless of whether a query to the advertisement server is generated by a user or in context to a given page's content, a query containing these keywords is passed to the ad server 902 which then processes the query with the query expander 907. The query expander 907 can do any or all of the following:

a) use the statistical enhancer 410 to determine the most relative concepts that are related to the query or keywords;

b) determine if any items in the query represent concepts in the ontology and if so, can determine domain-specific ways to improve the query, make the query more comprehensive, or add additional queries that are related to the original query that should also be performed; and/or c) determine if any concepts related to the query (as determined by the statistical enhancer 410) represent concepts in the ontology that should also be used in domain-specific ways to improve the query, either by modifying it or by introducing additional queries that are related to the original query that should also be performed.

As an example, if in the medical domain a website search engine submits the following query to the advertising system:
   herceptin treatment the query can be provided to a query expander 907 which can output the following set of queries:
   (herceptin OR trastuzumab) treatment
   breast cancer herceptin treatment
   (herceptin OR trastuzumab) "clinical trials"

In this example, the first term (herceptin) has been recognized as a drug and in the first query, using domain knowledge in the ontology, the term has been expanded to include the drug's generic name (trastuzumab). In the second query output, the drug has been recognized as associated with breast cancer, and the term breast cancer has been added to the query. In the last query, it has been recognized that any clinical trials may also be appropriate for or relevant to this query set.

These queries could also be represented as a single query with the different clauses separated by the logical OR operator, for example:
   ((herceptin OR trastuzumab) treatment) OR (herceptin genentech treatment) OR (breast cancer herceptin treatment) OR (herceptin clinical trials)

The queries output from the query expander 907 may not specify only keywords that the advertiser has subscribed to, but also concepts that the advertiser has subscribed to and the degree of expansion that was done to arrive at those concepts (e.g., the original query from the website may have referred to a concept directly or alternatively, the concept may have been added because it was deemed highly relevant). This approach is useful when the advertiser is allowed to specify concepts, in addition to keywords, that they wish to target. A representation of one query generated from "herceptin treatment" with this information is shown below:
   indication: breast cancer(1) drug:herceptin(0) keywords: treatment(0)

This specifies that an indication was found highly correlated to the query and that the query itself included a concept as well as a keyword, which in this example, may not have been recognized by the statistical enhancer 410 as a concept. Under this notation, (0) represents a direct match and (1) indicates a related concept. Less closely associated concepts may also be indicated with higher (x) values. In an alternative embodiment, the output may provide a score as established by the statistical enhancer 410, indicating how strong a concept is associated to a query, or an ordering/ranking of the related concepts based on their scores.

A matcher 908 processes the query or queries that are output from the query expander 907 and finds advertisements that match that set of queries. Depending upon the algorithm used and/or the requirements of the advertiser (who may be able to specify which requirements must be met), this process may require exact matches or may find advertisements that only partially match the input queries. The matcher 908 returns a set of advertisements, or if more than one query is given to the matcher 908, it may return multiple sets of advertisements, which then are sent to the merger 909 for processing.

The merger 909 receives one or more sets of advertisements that match the query or queries generated by the query expander 907. The merger 909 can use one of several methods to consolidate the sets of advertisements into one ranked list of advertisements to send back to the service caller, or can use a combination of methods. These methods include, among others:

a) Using metrics or a combination of metrics associated with the purchase and display of one or more advertisements and the response of one or more users to the viewing of these advertisements. Such metrics include but are not limited to the cost per impression (CPM), cost per click (CPC), and cost per action (CPA) as well as the click-through count and the click-through rate (CTR).

b) comparing the strength of the match between ads and the set of queries, such as the number of keywords that the advertising campaign matches as a fraction of the number of keywords of the query.

c) using domain knowledge to order the advertisements according to the query that the advertisement matches, or the number of queries the advertisement matches. For example, a query produced that has clinical trials in the query may be considered more valuable than one that doesn't have clinical trials.

d) ranking the advertisements by comparing the owner, the content of the advertisement, and/or the content of the advertisement's destination with the concepts extracted from the relevance analysis of the original query entered into the system.

e) Any combination or sub-combination of approaches described above.

In one embodiment, the click-through rates for advertisements are captured and can be used to adjust the strength of certain relationships in the ontology or for use in the ranking algorithm of the merger 909. For example, if a query is found to be associated with a certain drug which is then included to find advertisements and those advertisements are not clicked on sufficiently, the association between that query, or the concepts related to that query, and the drug may be weaker than proposed by the statistical enhancer 410. In one implementation, the click-through data is captured and used in the calculation of the relative relationship strengths. In another embodiment, the merger 909 adjusts relative rankings based on this data.

Figure 10:
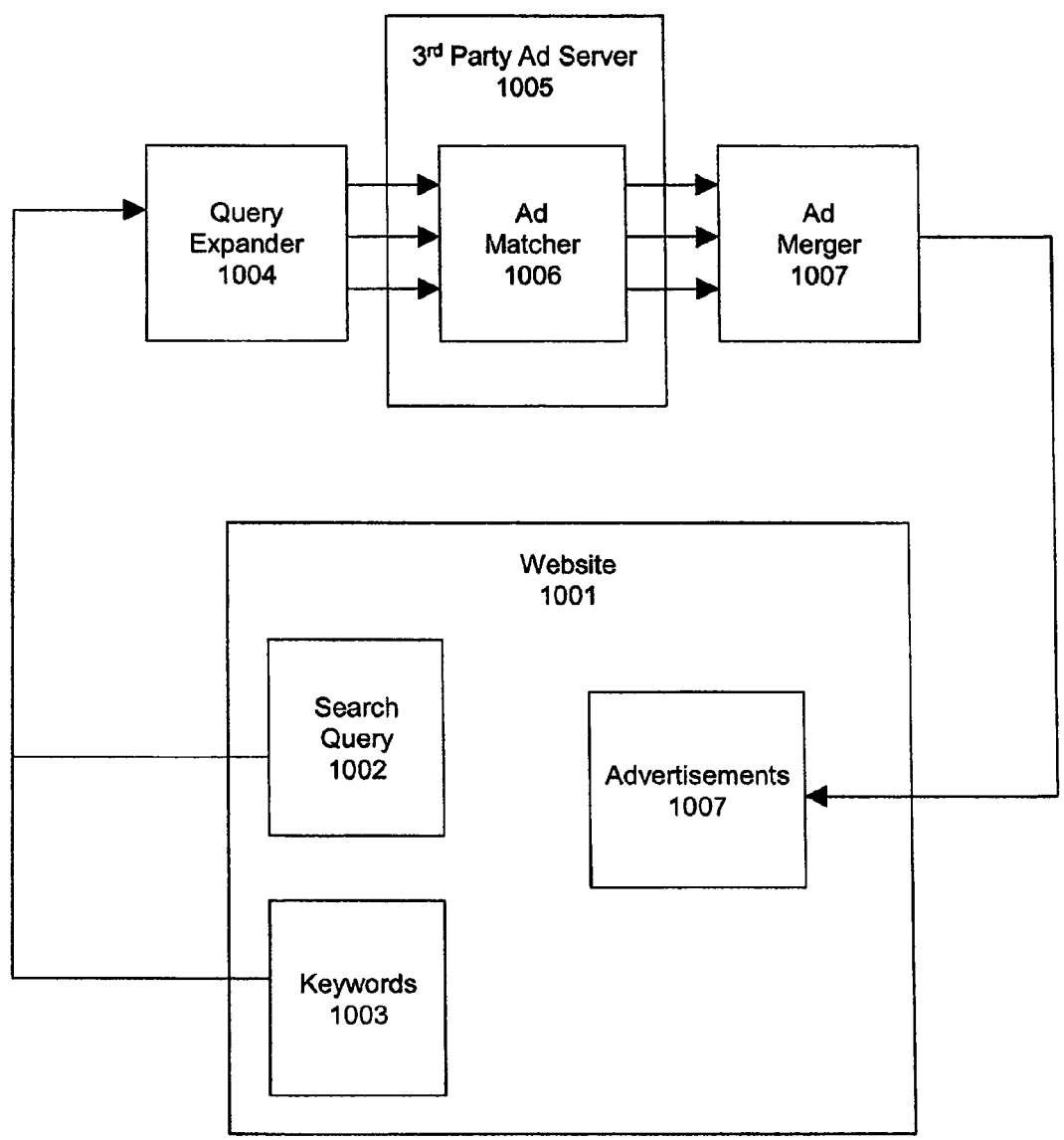
FIG. 10 is an embodiment of an ontological processing system integrated into an existing online advertising system.

In one embodiment, as shown in FIG. 10, a concept-based advertising process is incorporated with a third party's ad server system 1005 by having a query expander 1004 intercept queries from the website 1001, generate one or more queries to the ad server 1005 using the keyword expansion discussed above. In this scenario, if the advertiser is not allowed to subscribe to concepts but only keywords, the query expander 1004 outputs keywords as queries and not concepts. The ad server 1005 returns one or more sets of advertisements, one for each query generated by the query expander 1004, which is then used by a merger 1007 to produce a consolidated, ranked list of advertisements.

Figure 11:
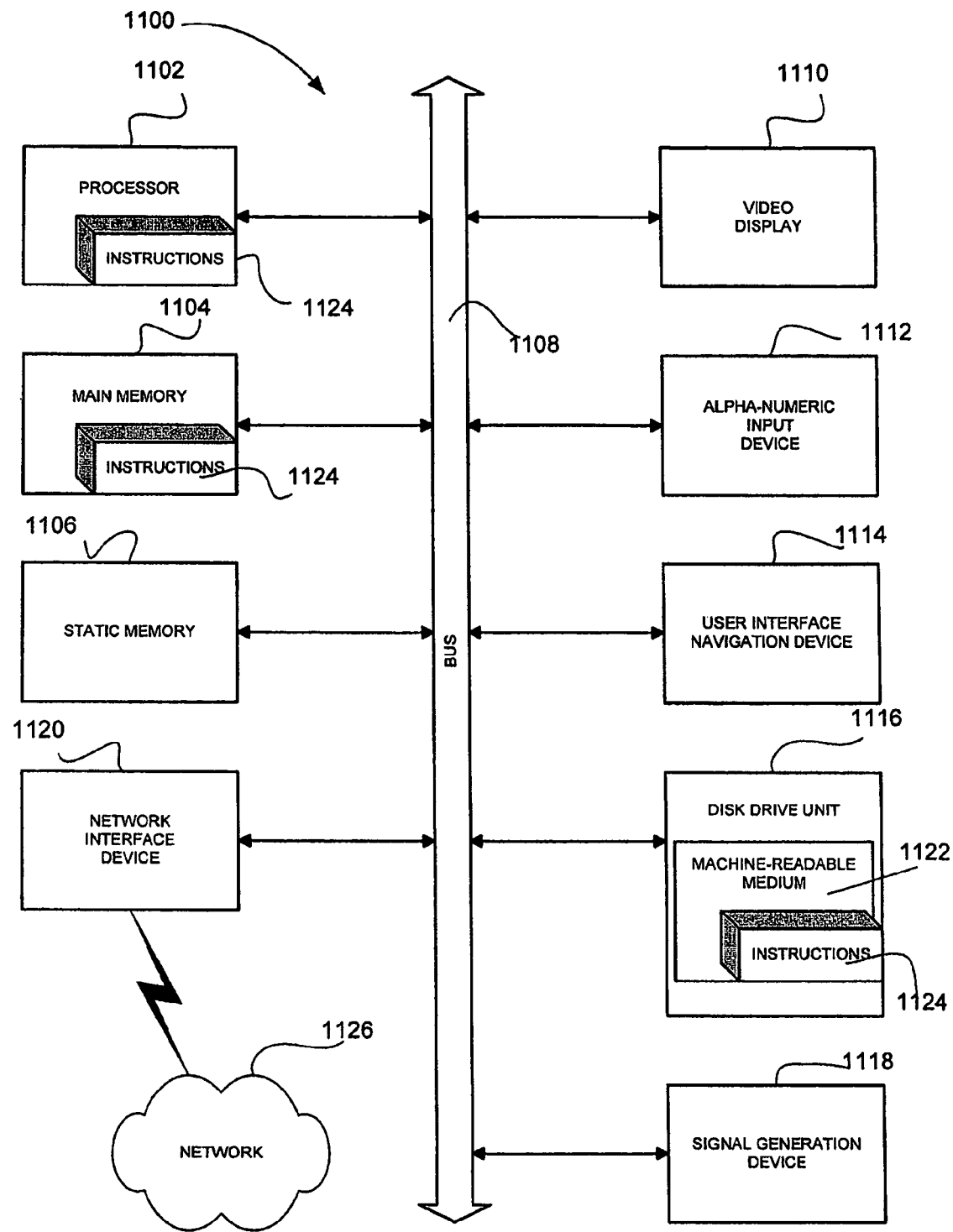
FIG. 11 is an embodiment of a computer system that may be used to implement any one or more of methodologies described herein.

FIG. 11 shows an exemplary computer system that may be used to implement any one or more of methodologies described herein. The exemplary computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media. The software 1124 may further be transmitted or received over a network 1126 via the network interface device 1120.

Any other computer and/or digital information processing systems can also be used to implement any one or more of the methods, systems or devices described herein. For example, in other embodiments, the computer includes a personal digital assistant, a cellular telephone, a digital music player, such as an IPOD®, or any other such computing device known to those of skill in the art.

While the machine-readable medium 1122 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Although this invention has been disclosed in the context of certain preferred embodiments, it will be understood by those skilled in the art that the present invention extends beyond the specifically disclosed embodiment to other alternative embodiments and/or uses of the invention and obvious modifications and equivalents thereof. In particular, while the present domain knowledge-assisted information processing system and methods have been described in the context of a particularly preferred embodiment, the skilled artisan will appreciate, in view of the present disclosure, that certain advantages, features and aspects of the information communication system, device, and method may be realized in a variety of other applications and software systems. Additionally, it is contemplated that various aspects and features of the invention described can be practiced separately, combined together, or substituted for one another, and that a variety of combination and sub-combinations of the features and aspects can be made and still fall within the scope of the invention.

Those of skill in the art will understand that information and signals can be represented using a variety of different technologies and techniques. For example, data, instructions, commands, information, signals, bits, symbols, and chips that can be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein can be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or other form of storage medium known in the art. A storage medium is coupled to the processor, such that the processor can read information from, and write information to, the storage medium. In the alternative, the storage medium can be integral to the processor. The processor and the storage medium can reside in an ASIC. The ASIC can reside in a user terminal. The processor and the storage medium can reside as discrete components in a user terminal.

The previous description of the disclosed embodiments is provided to enable a person skilled in the art to make or use the present invention. Various modifications to these embodiments will be readily apparent to those skilled in the art, and the generic principles defined herein can be applied to other embodiments without departing from the spirit or scope of the invention. Thus, the invention is limited only by the claims that follow. Thus, it is intended that the scope of the present invention herein disclosed should not be limited by the particular disclosed embodiment described above, but should be determined only by a fair reading of the claims that follow.

What is claimed is:

1. A method of searching for information, comprising:
   receiving a query;
   providing the query to a first search engine that searches a set of data sources, the data sources having relationships to at least one ontology, the ontology modeling relationships between concepts in a domain and data source content containing information specific to the concepts;
   receiving search results from the search engine;
   analyzing the search results with one or more processors to determine at least one statistic corresponding to the search results and the query, wherein the statistic is based upon a relevance score for each of a plurality of concepts given the query, the relevance score expressed as $$r_{cq} = w(c) \sum_i [w(i) f(h_c, h_q)]$$

where w(c) is a weighing function related to a concept c, w(i) is a weighing function for a data source item i, $h_c$ is a set of items related to the concept c, $h_q$ is a set of items related to the query q, and $f(h_c, h_q)$ is a normalized score function, wherein weighing function w (i) varies by data source;
providing a subset of the concepts to a user based on the relevance score; and
using a template to process domain specific rules and the subset of the concepts.

2. The method of claim 1, wherein using a template to process comprises defining properties in the ontology that are to be added to the query in order to perform a focused search.

3. The method of claim 1, further comprising:
receiving a selection of one of the at least one concept based on the relevance score; and
performing a focused search using a second search engine by combining the selected concept with the original query and submitting the combination to the second search engine.

4. The method of claim 3, wherein performing a focused search comprises combining the selection and the query with a logical OR operator.

5. The method of claim 3, wherein performing a focused search comprises combining the selection and the query with a logical AND operator.

6. The method of claim 3, wherein the selection comprises at least one concept data field entry and performing a focused search comprises combining the at least one concept data field entry and the query with a logical OR operator.

7. The method of claim 3, wherein the selection comprises at least one concept data field entry and performing a focused search comprises combining the at least one concept data field entry and the query with a logical AND operator.

8. The method of claim 3, wherein the selection comprises a drug related to the query.

9. The method of claim 3, wherein the selection comprises a therapy related to the query.

10. The method of claim 3, wherein the selection comprises a synonym of the query.

11. The method of claim 3, wherein the selection comprises a trade name of the query.

12. The method of claim 3, wherein the selection comprises a generic name of the query.

13. The method of claim 3, wherein the selection comprises a project name of the query.

14. The method of claim 3, wherein the selection comprises a medical treatment related to the query.

15. The method of claim 1, wherein the user is a human being.

16. The method of claim 3, wherein the second search engine is the same as the first search engine.

17. The method of claim 1, wherein the query comprises a concept.

18. The method of claim 1, wherein the concept comprises a filter identified by the ontology as being relevant to the query.

19. The method of claim 1, wherein the set of data sources comprises healthcare domain information.

20. The method of claim 1, wherein the query comprises a medical treatment.

21. The method of claim 1, wherein the statistic is determined based upon frequency analysis of the search results, the frequency analysis comprising determining a query occurrence rate of the query within the search results.

22. The method of claim 1, wherein the statistic is determined based upon an occurrence rate of a keyword within the search results, wherein the keyword is related to the query.

23. The method of claim 1, further comprising ranking the search results based at least in part upon the at least one statistic.

24. The method of claim 1, wherein the search engine searches a domain of information related to a particular subject.

25. The method of claim 24, wherein the domain comprises a medical information database.

26. A computer comprising a user input device, a user output device, and a processor, wherein the computer performs the method according to claim 1.

27. The method of claim 1, wherein the receiving a query comprises receiving a query from an Internet search.

28. The method of claim 1, wherein the receiving a query comprises receiving a query from an advertising engine, wherein the advertising engine provides an advertisement based upon a user input.

29. A domain processing system, comprising:
an ontology connector that identifies ontology content stored in a database related to a selected domain of information, wherein the ontology content is related to a query received from a user and models relationships between concepts in the domain and data source content containing information specific to the concepts;
a query expander that generates an enhanced query based at least in part on the query- and the ontology content;
at least one search tool that receives the enhanced query and search a network fox network content related to the query, wherein the search tool provides search results indicative of the network content based upon the enhanced query;
a results processor that analyzes and generate statistics based at least h part upon a relevance score for at last one concept given the query, the relevance score expressed as $$r_{cq} = w(c) \sum_i [w(i) f(h_c, h_q)]$$

where w(c) is a weighing function related to a concept c, w(i) is a weighing function for a data source item i, $h_c$ is a set of items related to the concept c, $h_q$, is a set of items related to the query q, and $f(h_c, h_q)$ is a normalized score function, wherein weighing function w(i) varies according to the recency of the data some item; and
a user interface that provides the search results and a most relevant concept to a user via a display device, the most relevant concept determined according to the relevance score.

30. A computer comprising a user input device, a user output device, and a processor, wherein the computer performs the method of searching for information, comprising:
receiving a query;
providing the query to a first search engine that searches a set of data sources, the data sources having relationships defined in at least one ontology, the ontology modeling concepts within the set of data sources and the relationships between the concepts;

receiving search results from the search engine;

analyzing the search results to determine at least one statistic corresponding to the search results and the query, wherein the statistic is based upon a relevance score for each of a plurality of concepts given the query, the relevance score expressed as $$r_{cq} = w(c) \sum_i [w(i) f(h_c, h_q)]$$

where w(c) is a weighing function related lo a concept c, w(i) is a weighing function for a data source item i, $h_c$ is a set of items related to the concept c, $h_q$ is a set of items related to the query q, and $f(h_c, h_q)$ is a normalized score function;

providing a subset of the plurality of concepts to a user based at least on the relative relevance scores for the plurality of concepts;

receiving a selection from the user of one concept from the subset; and using a template to process domain specific d e s and the selected concept to perform a focused search using a second search engine based at least upon the selection and the query;

wherein the statistic is determined based at least on a frequency analysis of the search results, the frequency analysis comprising determining a query occurrence rate of the query within the search results or a keyword occurrence rate of a keyword within the search results, wherein the keyword is related to the query.

* * * * *